(12) United States Patent
Toraya et al.

(10) Patent No.: US 10,962,489 B2
(45) Date of Patent: Mar. 30, 2021

(54) QUANTITATIVE PHASE ANALYSIS DEVICE, QUANTITATIVE PHASE ANALYSIS METHOD, AND QUANTITATIVE PHASE ANALYSIS PROGRAM

(71) Applicant: Rigaku Corporation, Tokyo (JP)

(72) Inventors: Hideo Toraya, Tokyo (JP); Akihiro Himeda, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 162 days.

(21) Appl. No.: 16/111,695

(22) Filed: Aug. 24, 2018

(65) Prior Publication Data

US 2018/0364183 A1    Dec. 20, 2018

Related U.S. Application Data

(63) Continuation of application No. PCT/JP2016/088488, filed on Dec. 22, 2016.

(30) Foreign Application Priority Data

Feb. 29, 2016   (JP) .............................. JP2016-038280

(51) Int. Cl.
*G01N 23/2055* (2018.01)
*G01N 23/207* (2018.01)

(52) U.S. Cl.
CPC ....... *G01N 23/2055* (2013.01); *G01N 23/207* (2013.01); *G01N 23/2076* (2013.01); *G01N 2223/605* (2013.01)

(58) Field of Classification Search
CPC ....... G01N 2223/605; G01N 23/20025; G01N 23/20058; G01N 23/2055; G01N 23/207; G01N 23/2076
See application file for complete search history.

(56) References Cited

U.S. PATENT DOCUMENTS

| | | | | |
|---|---|---|---|---|
| 2002/0003857 A1* | 1/2002 | Koyanagi | .............. | G01N 23/20 378/70 |
| 2005/0099423 A1* | 5/2005 | Brauss | .................. | G06T 11/206 345/440 |
| 2009/0305882 A1* | 12/2009 | Dahar | ................... | B01J 35/002 502/303 |

OTHER PUBLICATIONS

Chung, F.H., "Quantitative Interpretation of X-ray Diffraction Patterns of Mixtures. I. Matrix-Flushing Method for Quantitative Multicomponent Analysis," J. Appl. Cryst., 1974, No. 7, pp. 519-525.

(Continued)

*Primary Examiner* — Chih-Cheng Kao
(74) *Attorney, Agent, or Firm* — Cantor Colburn LLP

(57) ABSTRACT

Provided are an operation guide system, an operation guide method, and an operation guide program, which are capable of allowing a user to easily understand measurement of an X-ray optical system to be selected. A quantitative phase analysis device includes qualitative phase analysis result acquisition means for acquiring information on a plurality of crystalline phases contained in a sample, and weight ratio calculation means for calculating a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the plurality of crystalline phases.

17 Claims, 20 Drawing Sheets

(56) References Cited

OTHER PUBLICATIONS

Chung, F. H., "Quantitative Interpretation of X-ray Diffraction Patterns of Mixtures. II. Adiabatic Principle of X-ray Diffraction Analysis of Mixtures," J. Appl. Cryst., 1974, No. 7, pp. 526-531.
Werner, P.-E., et al., "Quantitative Analysis of Multicomponent Powders by Full-Profile Refinement of Guinier-Hagg X-ray Film Data," J. Appl. Cryst., 1979, No. 12, pp. 107-109.
Hill, R. J., et al., "Quantitative Phase Analysis from Neutron Powder Diffraction Data Using the Rietveld Method," J. Appl. Cryst., 1987, No. 20, pp. 467-474.
Toraya, H., et al., "Quantitative Phase Analysis using the Whole-Powder-Pattern Decomposition Method. I. Solution from Knowledge of Chemical Compositions," J. Appl. Cryst., 1995, No. 28, pp. 392-399.
Scarlett, N. V. Y., et al., "Quantification of phases with partial or no known crystal structure," Powder Diffraction, 2006, No. 21, pp. 278-284.

\* cited by examiner

FIG.4

|  | FIRST SAMPLE | | | SECOND SAMPLE | | | THIRD SAMPLE | | | FOURTH SAMPLE | | |
|---|---|---|---|---|---|---|---|---|---|---|---|---|
|  | NUMBER | SUPERIM-POSITION | % | NUMBER | SUPERIM-POSITION | % | NUMBER | SUPERIM-POSITION | % | NUMBER | SUPERIM-POSITION | % |
| TOTAL REFLECTION NUMBER | 73 | 10 | 14 | 65 | 3 | 5 | 151 | 34 | 23 | 43 | 6 | 14 |
| FIRST COMPONENT | 41 | 7 | 17 | 30 | 3 | 10 | 115 | 30 | 26 | 19 | 4 | 21 |
| SECOND COMPONENT | 30 | 9 | 30 | 29 | 3 | 10 | 35 | 17 | 49 | 23 | 3 | 13 |
| THIRD COMPONENT | 12 | 4 | 33 | 9 | 0 | 0 | 35 | 19 | 54 | 7 | 5 | 71 |

FIG.5A

FIRST SAMPLE: CONTAINING CRYSTALLINE PHASE HAVING STRONG ORIENTATION
(2θ ≦ 90° DATA)

|  | Calcite CaCO₃ | | Anatase TiO₂ | | Fluorite CaF₂ | |
|---|---|---|---|---|---|---|
| MIXING VALUE | 43.40 | | 23.23 | | 33.37 | |
| FIRST METHOD | 37.83 | −5.57 | 24.13 | 0.90 | 38.04 | 4.67 |
| SECOND METHOD | 38.34 | −5.06 | 22.82 | −0.41 | 38.84 | 5.47 |
| Rietveld | 45.3 | 1.90 | 23.0 | −0.23 | 31.7 | −1.67 |
| RIR | 60.8 | 17.40 | 15.4 | −7.83 | 23.8 | −9.57 |

FIG.5B

SECOND SAMPLE: CONTAINING CRYSTALLINE PHASE HAVING SCATTERING ABILITY OF SAME DEGREE (2θ ≦ 90° DATA)

|  | Anatase TiO₂ | | Rutile TiO₂ | | Silicon S | |
|---|---|---|---|---|---|---|
| MIXING VALUE | 54.00 | | 24.47 | | 21.53 | |
| FIRST METHOD | 52.50 | −1.50 | 25.20 | 0.73 | 22.30 | 0.77 |
| SECOND METHOD | 53.89 | −0.11 | 23.81 | −0.66 | 22.30 | 0.77 |
| Rietveld | 56.38 | 2.38 | 21.64 | −2.83 | 21.98 | 0.45 |
| RIR | 55.56 | 1.56 | 21.98 | −2.49 | 22.46 | 0.93 |

FIG.5C

THIRD SAMPLE: CONTAINING COMPONENT HAVING LARGE SCATTERING ABILITY
(2θ ≦ 90° DATA)

|  | Barite BaSO₄ | | Quartz SiO₂ | | Corundum Al₂O₃ | |
|---|---|---|---|---|---|---|
| MIXING VALUE | 50.27 | | 11.60 | | 38.13 | |
| FIRST METHOD | 46.86 | −3.41 | 14.50 | 2.90 | 38.64 | 0.51 |
| SECOND METHOD | 49.37 | −0.9 | 11.29 | −0.31 | 39.34 | 1.21 |
| Rietveld | 38.74 | −11.53 | 22.9 | 11.3 | 38.4 | 0.27 |
| RIR | 36.08 | −14.19 | 23.4 | 11.8 | 40.5 | 2.37 |

FIG.5D

FOURTH SAMPLE: CONTAINING MINOR COMPONENT (2θ ≦ 90° DATA)

|  | Magnetite Fe₃O₄ | | Hematite Fe₂O₃ | | Anatase TiO₂ | |
|---|---|---|---|---|---|---|
| MIXING VALUE | 62.87 | | 35.00 | | 2.13 | |
| FIRST METHOD | 53.05 | −9.82 | 30.95 | −4.05 | 16.00 | 13.87 |
| SECOND METHOD | 63.28 | 0.41 | 34.48 | −0.52 | 2.24 | 0.11 |
| Rietveld | 62.0 | −0.87 | 36.14 | 1.14 | 1.86 | −0.27 |
| RIR | 61.2 | −1.67 | 36.58 | 1.58 | 2.24 | 0.11 |

FIG.6
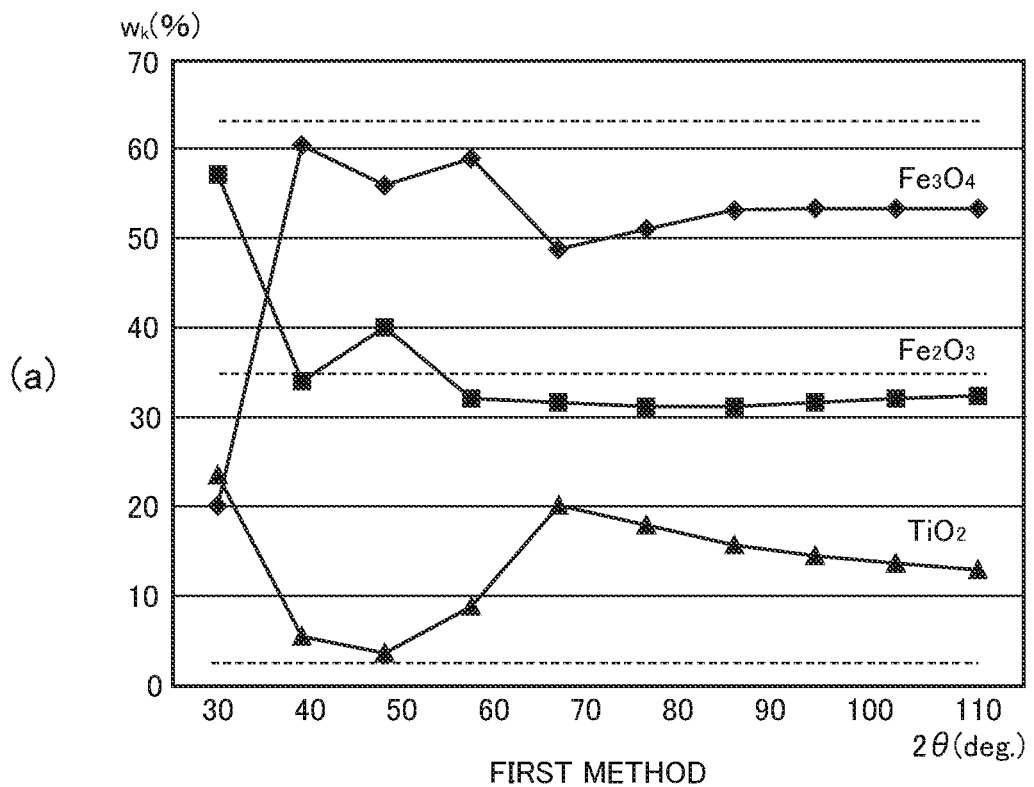
(a) FIRST METHOD
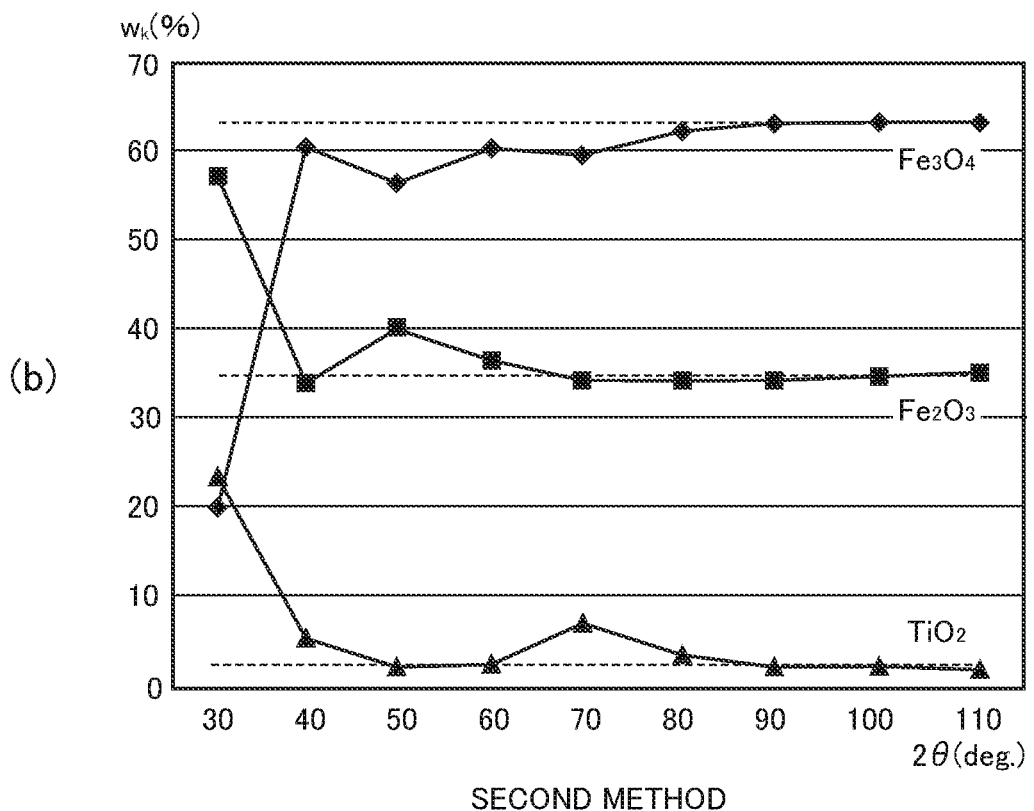
(b) SECOND METHOD

FIG.7

| CHEMICAL COMPOSITION | $a_k$ | CHEMICAL COMPOSITION | $a_k$ |
|---|---|---|---|
| TiO | 0.11660 | FeTiO$_3$ | 0.11224 |
| FeO | 0.09709 | Fe$_2$TiO$_4$ | 0.10688 |
| Fe$_2$O$_3$ | 0.10343 | Fe$_2$TiO$_5$ | 0.11113 |
| Fe$_3$O$_4$ | 0.10137 | AVERAGE VALUE | 0.10696 (0.00632) |

FIG.8

| CHEMICAL COMPOSITION | $a_k$ | $S_k$ |
|---|---|---|
| $FeTiO_3$ | 0.11224 | 2632.54 |
| $Fe_2TiO_4$ | 0.10688 | 1419.46 |
| UNCONFIRMED CRYSTALLINE PHASE | UNKNOWN | 59.01 |

FIG.9

| CHEMICAL COMPOSITION | $w_k^{AV}$ | $w_k^{True}$ | $w_k^{AV} - w_k^{True}$ |
|---|---|---|---|
| | AVERAGE VALUE (0.10696) USED | α=0.10343 USED | |
| FeTiO₃ | 65.15% | 65.18% | -0.03% |
| Fe₂TiO₄ | 33.45% | 33.47% | -0.02% |
| UNCONFIRMED CRYSTALLINE PHASE | 1.39% | 1.35% | 0.04% |
| ERROR AVERAGE | | | 0.03% (average) |

FIG.10

| $\sigma(a_n)/a_n$ | $w_k=1\%$ | 2% | 3% | 4% | 5% |
|---|---|---|---|---|---|
| 0.02 (2%) | 0.020% | 0.039% | 0.058% | 0.077% | 0.095% |
| 0.04 (4%) | 0.040% | 0.078% | 0.116% | 0.154% | 0.190% |
| 0.06 (6%) | 0.059% | 0.118% | 0.175% | 0.230% | 0.285% |
| 0.08 (8%) | 0.079% | 0.157% | 0.233% | 0.307% | 0.380% |
| 0.10 (10%) | 0.099% | 0.196% | 0.291% | 0.384% | 0.475% |

FIG.11

| CHEMICAL COMPOSITION | $a_k$ | CHEMICAL COMPOSITION | $a_k$ |
|---|---|---|---|
| ZnO | 0.08441 | $(Zn_{0.4}Fe_{0.6})Fe_2O_4$ | 0.09915 (x = 0.4) |
| $\alpha\text{-}Fe_2O_3$ | 0.10343 | $(Zn_{0.6}Fe_{0.4})Fe_2O_4$ | 0.09810 (x = 0.6) |
| $FeFe_2O_4$ | 0.10137 (x = 0.0) | $(Zn_{0.8}Fe_{0.2})Fe_2O_4$ | 0.09709 (x = 0.8) |
| $(Zn_{0.2}Fe_{0.8})Fe_2O_4$ | 0.10024 (x = 0.2) | $ZnFe_2O_4$ | 0.09612 (x = 1.0) |

FIG.12A

| CRYSTALLINE PHASE | $S_k$ | $w_k$ | | | |
|---|---|---|---|---|---|
| | | X = 0 | X = 0.2 | X = 0.4 | X = 0.6 |
| | | 0.10137 | 0.10024 | 0.09915 | 0.09810 |
| $(Zn_xFe_{1-x})Fe_2O_4$ | 2981.36 | 96.38% | 96.34% | 96.30% | 96.26% |
| ZnO | 58.37 | 1.57% | 1.59% | 1.61% | 1.62% |
| $\alpha$-$Fe_2O_3$ | 62.25 | 2.05% | 2.08% | 2.10% | 2.12% |

FIG.12B

| CRYSTALLINE PHASE | $w_k$ | | DIFFERENCE BETWEEN X=0 and X=1 |
|---|---|---|---|
| | X = 0.8 | X = 1 | |
| | 0.09709 | 0.09612 | 0.00525 (5.5%) |
| $(Zn_xFe_{1-x})Fe_2O_4$ | 96.22% | 96.19% | 0.19% |
| ZnO | 1.64% | 1.65% | -0.08% |
| $\alpha$-$Fe_2O_3$ | 2.14% | 2.16% | -0.11% |

FIG.13

| PEROVSKITE TYPE | | PYROCHLORE TYPE | | | |
| --- | --- | --- | --- | --- | --- |
| | | DEFICIENCY OF OXYGEN | | DEFICIENCY OF OXYGEN + DEFICIENCY OF CATION | |
| CHEMICAL COMPOSITION | $a_k$ | CHEMICAL COMPOSITION | $a_k$ | CHEMICAL COMPOSITION | $a_k$ |
| $PbZr_{0.6}Ti_{0.4}O_3$ | 0.04078 | $Pb_2Zr_{1.2}Ti_{0.8}O_{6.5}$ | 0.04119 | $Pb_{1.8}Zr_{1.2}Ti_{0.8}O_{6.5}$ | 0.04214 |
| $PbZr_{0.5}Ti_{0.5}O_3$ | 0.04081 | $Pb_2ZrTiO_{6.5}$ | 0.04123 | $Pb_{1.8}ZrTiO_{6.5}$ | 0.04219 |
| $PbZr_{0.4}Ti_{0.6}O_3$ | 0.04084 | $Pb_2Zr_{0.8}Ti_{1.2}O_{6.5}$ | 0.04126 | $Pb_{1.8}Zr_{0.8}Ti_{1.2}O_{6.5}$ | 0.04224 |

FIG.14

| CRYSTALLINE PHASE | $S_k$ | MODEL | $w_k$ | | DIFFERENCE |
|---|---|---|---|---|---|
| | | | DEFICIENCY OF OXYGEN | DEFICIENCY OF OXYGEN + CATION | |
| PEROVSKITE TYPE | 2681.36 | $Zr_{1.2}Ti_{0.8}$ | 62.51% | 61.97% | 0.54% |
| | | ZrTi | 62.50% | 61.96% | 0.54% |
| | | $Zr_{0.8}Ti_{1.2}$ | 62.50% | 61.95% | 0.55% |
| AVERAGE AND DEVIATION | | | 62.51(1)% | 61.96(1)% | |
| PYROCHLORE TYPE | 1592.14 | $Zr_{1.2}Ti_{0.8}$ | 37.49% | 38.03% | -0.54% |
| | | ZrTi | 37.50% | 38.04% | -0.54% |
| | | $Zr_{0.8}Ti_{1.2}$ | 37.50% | 38.05% | -0.55% |
| AVERAGE AND DEVIATION | | | 37.50(1)% | 38.04(1)% | |

FIG.15

| MINERAL SPECIES | CHEMICAL COMPOSITION | $M_k$ | $\sum_{i=1}^{A_k} n_i^2$ | $a_k$ |
|---|---|---|---|---|
| Muscovite | $KAl_2(Si_3Al)O_{10}(OH)_2$ | 398.3132 | 2226 | 0.17894 |
| | $KAl_{1.7}Mg_{0.2}Fe^{+2}_{0.1}(Si_{3.3}Al_{0.7})O_{10}(OH)_2$ | 371.3317 | 2057 | 0.18052 |
| | AVERAGE VALUE | | | 0.17973 |
| Biotite | $KAl_{0.4}Mg_{0.9}Fe^{+2}_{1.5}(Si_3Al)O_{10}(OH)_2$ | 400.1972 | 2564 | 0.15608 |
| | $KAl_{0.3}Mg_{1.1}Fe^{+2}_{1.3}Fe^{+3}_{0.2}(Si_{2.7}Al_{1.3})O_{10}(OH)_2$ | 396.4232 | 2512 | 0.15781 |
| | AVERAGE VALUE | | | 0.15695 |
| α-quartz | $SiO_2$ | 60.0848 | 324 | 0.18545 |

FIG.16A

| MINERAL SPECIES | $S_k$ | QUANTIFICATION EXAMPLE 1 | | QUANTIFICATION EXAMPLE 2 | | QUANTIFICATION EXAMPLE 3 | |
|---|---|---|---|---|---|---|---|
| | | $a_k$ | $w_k$ | $a_k$ | $w_k$ | $a_k$ | $w_k$ |
| Muscovite | 2845.68 | 0.17894 | 58.90% | 0.18052 | 58.87% | 0.17973 | 58.89% |
| Biotite | 2083.23 | 0.15608 | 37.61% | 0.15781 | 37.68% | 0.15695 | 37.64% |
| α-quartz | 162.56 | 0.18545 | 3.49% | 0.18545 | 3.46% | 0.18545 | 3.47% |

FIG.16B

| MINERAL SPECIES | QUANTIFICATION EXAMPLE 4 | | QUANTIFICATION EXAMPLE 5 | | Av. $w_k$ | STANDARD DEVIATION |
|---|---|---|---|---|---|---|
| | $a_k$ | $w_k$ | $a_k$ | $w_k$ | | |
| Muscovite | 0.17894 | 58.66% | 0.18052 | 59.11% | 58.89% | 0.14% |
| Biotite | 0.15781 | 37.87% | 0.15608 | 37.42% | 37.64% | 0.14% |
| α-quartz | 0.18545 | 3.47% | 0.18545 | 3.47% | 3.47% | 0.01% |

FIG.17

| Mineral | Composition | $M_k$ | $a_k$ | $w_k$ |
|---|---|---|---|---|
| Larnite | $Ca_2SiO_4$ | 172.244 | 0.137575 | 0.20 |
| Quartz | $SiO_2$ | 60.085 | 0.185447 | 0.10 |
| Corundum | $Al_2O_3$ | 101.961 | 0.192380 | 0.05 |
| Magnetite | $Fe_3O_4$ | 231.539 | 0.101374 | 0.125 |
| Periclase | MgO | 40.311 | 0.193805 | 0.025 |

FIG.18

| Mineral | Composition | Factor $f$ | NUMBER OF EACH RELATIVE ATOM |
|---|---|---|---|
| Larnite | $Ca_2SiO_4$ | 2.36783 | Ca = 4.73565, Si = 2.36783, O = 9.47131 |
| Quartz | $SiO_2$ | 3.39389 | Si = 3.39389, O = 6.78778 |
| Corundum | $Al_2O_3$ | 1.0 | Al = 2, O = 3 |
| Magnetite | $Fe_3O_4$ | 1.10091 | Fe = 3.30272, O = 4.40362 |
| Periclase | MgO | 1.26468 | Mg = 1.26468, O = 1.26468 |

FIG.20A

| Mineral | Formula | $s_k$ | $a_k$ | $w_k$ | FIRST | SECOND | THIRD |
|---|---|---|---|---|---|---|---|
| $a_{uk}$ | | | | | 0.138315 | 0.231032 | 0.182048 |
| Larnite | $Ca_2SiO_4$ | 559.3458 | 0.137575 | 0.40 | 0.405812 | 0.396195 | 0.401217 |
| Quartz | $SiO_2$ | 207.4771 | 0.185447 | 0.20 | 0.202905 | 0.198097 | 0.200609 |
| Corundum | $Al_2O_3$ | 100.00 | 0.192380 | 0.10 | 0.101452 | 0.099049 | 0.100304 |
| Magnetite | $Fe_3O_4$ | 474.4313 | 0.101374 | 0.25 | 0.253631 | 0.247622 | 0.250761 |
| Periclase | MgO | 49.6324 | 0.193805 | 0.05 | 0.036202 | 0.059037 | 0.047110 |
| Sum $w_{k'}$ | | | | 1.00 | 1.000002 | 1.000000 | 1.000001 |

FIG.20B

| FOURTH | FIFTH | SIXTH | SEVENTH | EIGHTH | NINTH | TENTH | ELEVENTH |
|---|---|---|---|---|---|---|---|
| 0.198981 | 0.191822 | 0.194626 | 0.193486 | 0.193948 | 0.193762 | 0.193832 | 0.193814 |
| 0.399467 | 0.400205 | 0.399915 | 0.400033 | 0.399985 | 0.400004 | 0.399997 | 0.399999 |
| 0.199733 | 0.200102 | 0.199958 | 0.200016 | 0.199993 | 0.200002 | 0.199999 | 0.200000 |
| 0.099867 | 0.100051 | 0.099978 | 0.100008 | 0.099996 | 0.100001 | 0.099999 | 0.100000 |
| 0.249667 | 0.250128 | 0.249947 | 0.250021 | 0.249991 | 0.250003 | 0.249999 | 0.249999 |
| 0.051267 | 0.049514 | 0.050201 | 0.049922 | 0.050035 | 0.049989 | 0.050007 | 0.050002 |
| 1.000001 | 1.000000 | 0.999999 | 1.000000 | 1.000000 | 0.999999 | 1.000001 | 1.000000 |

QUANTITATIVE PHASE ANALYSIS DEVICE, QUANTITATIVE PHASE ANALYSIS METHOD, AND QUANTITATIVE PHASE ANALYSIS PROGRAM

CROSS-REFERENCE TO RELATED APPLICATION

This application is a continuation of PCT/JP2016/088488 filed Dec. 22, 2016, which claims priority to Japanese Patent Application JP 2016-038280 filed on Feb. 29, 2016, the entire contents of both applications are hereby incorporated by reference in their entirety.

BACKGROUND OF THE INVENTION

1. Field of the Invention

The present invention relates to a quantitative phase analysis device, a quantitative phase analysis method, and a quantitative phase analysis program, which are configured to perform quantitative phase analysis of crystalline phases contained in a sample based on a powder diffraction pattern of the sample.

2. Description of the Related Art

When a sample is a mixture sample containing a plurality of crystalline phases, a powder diffraction pattern of the sample is acquired, for example, by measurement using an X-ray diffractometer. A powder diffraction pattern of a crystalline phase is specific to the crystalline phase, and the powder diffraction pattern of the sample is a powder diffraction pattern acquired by adding up powder diffraction patterns of the plurality of crystalline phases contained in the sample based on contents. In the present specification, the crystalline phase refers to a crystalline pure substance solid and has a chemical composition and a crystal structure.

Qualitative phase analysis involves analyzing which crystalline phase exists in the sample. Quantitative phase analysis involves analyzing in which quantitative ratio the plurality of crystalline phases contained in the sample exist. In this case, as the premise for performing quantitative phase analysis, it is assumed that qualitative phase analysis of the crystalline phases contained in the sample has been performed.

There have been known a plurality of methods of performing quantitative phase analysis of multicomponent powder through use of an integrated intensity of a specific diffraction line in a powder diffraction pattern of a sample. As a method having high accuracy, an internal standard method has been known. Further, there has been known a simple quantification method involving determining a weight ratio of crystalline phases based on a ratio between a reference intensity ratio (RIR) value compiled into a database and a highest peak intensity. The RIR quantification method using an RIR value is disclosed in Non Patent Documents 1 and 2. A Rietveld method using all the profile intensities within a measurement angle range has been known. A quantification method using the Rietveld method is disclosed in Non Patent Documents 3 and 4. Further, a whole-powder pattern decomposition method involving performing quantification based on a scale factor to be multiplied by an observed integrated intensity of each crystalline phase has been known. A quantification method using the whole-powder pattern decomposition method is disclosed in Non Patent Document 5.

CITATION LIST

Non Patent Document

[NPD 1] Chung, F. H., "Quantitative Interpretation of X-ray Diffraction Patterns of Mixtures. I. Matrix-Flushing Method for Quantitative Multicomponent Analysis", J. Appl. Cryst., 1974, No. 7, pages 519 to 525

[NPD 2] Chung, F. H., "Quantitative Interpretation of X-ray Diffraction Patterns of Mixtures. II. Adiabatic Principle of X-ray Diffraction Analysis of Mixtures", J. Appl. Cryst., 1974, No. 7, pages 526 to 531

[NPD 3] Werner, P.-E., Salome, S., Malmros, G., and Thomas, J. O., "Quantitative Analysis of Multicomponent Powders by Full-Profile Refinement of Guinier-Hagg X-ray Film Data", J. Appl. Cryst., 1979, No. 12, pages 107 to 109

[NPD 4] Hill, R. J. and Howard, C. J., "Quantitative Phase Analysis from Neutron Powder Diffraction Data Using the Rietveld Method", J. Appl. Cryst., 1987, No. 20, pages 467 to 474

[NPD 5] Toraya, H. and Tsusaka S., "Quantitative Phase Analysis using the Whole-Powder-Pattern Decomposition Method. I. Solution from Knowledge of Chemical Compositions", J. Appl. Cryst., 1995, No. 28, pages 392 to 399

[NPD 6] Scarlett, N. V. Y. and Madsen, I. C., "Quantification of phases with partial or no known crystal structure", Powder Diffraction, 2006, No. 21, pages 278 to 284

SUMMARY OF THE INVENTION

In the internal standard method, it is required to obtain a sample of each single crystalline phase of a plurality of crystalline phases contained in a sample and to create a calibration curve. Therefore, the internal standard method has a problem of lacking general versatility and rapidity. In the RIR quantification method using an RIR value, an RIR value compiled into a database is required. In the Rietveld method, crystal structural parameters of a plurality of crystalline phases contained in a powder sample are required. In the whole-powder pattern decomposition method, it is required to obtain a sample of a single crystalline phase. As the Rietveld method that is applicable to the case where structural parameters are not obtained with respect to a part of the crystal line phases out of the plurality of crystalline phases, a method using an RIR value with respect to a crystalline phase in which a structural parameter is not obtained, a PONKCS method, or the like has been known. The PONKCS method is disclosed in Non Patent Document 6. However, when a structural parameter is not obtained by any of the methods, an actually measured RIR value is required as reference data in the RIR quantification method, and a sample of a single crystalline phase or a sample close thereto is required as reference data in the PONKCS method.

There are a large number of cases in which it is desired, for a user who identifies a crystalline phase of a sample, that a crystalline phase to be targeted be subjected to quantitative phase analysis, although not requiring high accuracy, as well as qualitative phase analysis. Further, in the RIR quantification method using an RIR value and the Rietveld method, it is difficult for the user to perform quantitative phase analysis simply. This is because, in those methods, a database is required, and software that needs advanced calculation is required.

It is assumed that K (K represents an integer of 2 or more) crystalline phases are contained in a powder sample, and a j-th diffraction line of a k-th (k represents an integer of 1 or more and K or less) crystalline phase has an integrated intensity $I_{jk}$. The integrated intensity $I_{jk}$ of each diffraction line in a powder diffraction pattern of the sample is given by the following numerical expression 1.

$$I_{jk} = v_k \frac{Q}{\mu U_k^2} m_{jk} Lp_{jk} |F_{jk}|^2 \quad \text{[Math. 1]}$$

In the numerical expression 1, $v_k$ represents a volume fraction, Q represents a constant including a physical constant, for example, an incident X-ray intensity and a light velocity, and an optical system parameter, $\mu$ represents a linear absorption coefficient of the powder sample, $U_k$ represents a unit cell volume, $m_{jk}$ represents a multiplicity of reflection, $Lp_{jk}$ represents a Lorentz-polarization factor (hereinafter referred to as "Lp factor"), and $F_{jk}$ represents a crystal structure factor. When the sample does not contain an amorphous component, the volume fraction $v_k$ satisfies the following numerical expression 2.

$$\sum_{k=1}^{K} v_k = 1 \quad \text{[Math. 2]}$$

The integrated intensity $I_{jk}$ of a diffraction line in the numerical expression 1 is proportional to the volume fraction $v_k$ and is proportional to the volume (irradiated volume) of the sample, which contributes to diffraction. Further, the linear absorption coefficient $\mu$ is not determined unless the quantitative ratio of the plurality of crystalline phases is known. Therefore, it is considered to be difficult to calculate the quantitative ratio of the plurality of crystalline phases only based on the powder diffraction pattern of the sample through use of the observed integrated intensity from an integrated intensity formula including the linear absorption coefficient $\mu$.

The present invention has been made in view of the above-mentioned problems, and an object of the present invention is to provide a quantitative phase analysis device, a quantitative phase analysis method, and a quantitative phase analysis program, which are capable of performing quantitative phase analysis more simply.

Solution to Problem (1) In order to achieve the above-mentioned object, a quantitative phase analysis device according to one embodiment of the present invention is a quantitative phase analysis device configured to perform quantitative phase analysis of crystalline phases contained in a sample based on a powder diffraction pattern of the sample, the quantitative phase analysis device including: qualitative phase analysis result acquisition means for acquiring information on a plurality of crystalline phases contained in the sample; and weight ratio calculation means for calculating a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the plurality of crystalline phases acquired by the qualitative phase analysis result acquisition means.

(2) The quantitative phase analysis device according to the above-mentioned item (1), in which the weight ratio calculation means may calculate the weight ratio of the plurality of crystalline phases based on a weight factor obtained by dividing a product of the sum of the diffracted intensities corrected with respect to the Lorentz-polarization factor and the chemical formula weight by the sum of the squares of the numbers of the electrons belonging to each of the atoms contained in the chemical formula unit.

(3) The quantitative phase analysis device according to the above-mentioned item (2), in which the weight ratio of the plurality of crystalline phases may include a weight fraction of one of the plurality of crystal line phases with respect to the entire sample, and in which the weight ratio calculation means may calculate the weight fraction by calculating a ratio of a weight factor of the one of the plurality of crystalline phases with respect to a sum of weight factors of the plurality of crystalline phases.

(4) The quantitative phase analysis device according to any one of the above-mentioned items (1) to (3), in which, when the powder diffraction pattern of the sample includes a superimposed diffraction line in which diffraction lines of two or more crystalline phases exist and which is free from being decomposed by analysis, the weight ratio calculation means may equally distribute a diffracted intensity of the superimposed diffraction line into the two or more corresponding crystalline phases and calculate the weight ratio of the plurality of crystalline phases through use of the diffracted intensity to be distributed as the diffracted intensities of the diffraction lines of the two or more corresponding crystalline phases.

(5) The quantitative phase analysis device according to the above-mentioned item (3), in which, when the powder diffraction pattern of the sample includes a superimposed diffraction line in which diffraction lines of two or more crystalline phases exist and which is free from being decomposed by analysis, the weight ratio calculation means may include: distribution ratio determination means for distributing a diffracted intensity of the superimposed diffraction line into the two or more corresponding crystalline phases based on the weight fraction of each of the plurality of crystalline phases, which has been calculated; and weight fraction calculation means for calculating the weight fraction of each of the plurality of crystalline phases through use of the diffracted intensity to be distributed.

(6) The quantitative phase analysis device according to the above-mentioned item (5), in which the information on the plurality of crystalline phases acquired by the qualitative phase analysis result acquisition means may include a density, and in which the distribution ratio determination means may distribute the diffracted intensity of the superimposed diffraction line into the two or more corresponding crystalline phases in proportion to a volume fraction determined based on the weight fraction and the density of each of the plurality of crystalline phases.

(7) The quantitative phase analysis device according to the above-mentioned item (5) or (6), in which, when the weight fraction calculation means initially calculates the weight fraction of each of the plurality of crystalline phases, the weight fraction calculation means may equally distribute the diffracted intensity of the superimposed diffraction line into the two or more corresponding crystalline phases and calculate the weight fraction of each of the plurality of crystalline phases through use of the diffracted intensity to be distributed as the diffracted intensities of the diffraction lines of the two or more corresponding crystalline phases.

(8) The quantitative phase analysis device according to any one of the above-mentioned items (5) to (7), in which the distribution ratio determination means and the weight fraction calculation means may be repeatedly driven.

(9) The quantitative phase analysis device according to the above-mentioned item (3), in which, when the sample contains an unknown crystalline phase that is free from being identified by quantitative phase analysis, the weight ratio calculation means may calculate a weight factor of the unknown crystalline phase based on a chemical composition of each of the identified plurality of crystalline phases.

(10) The quantitative phase analysis device according to the above-mentioned item (2) or (3), in which, when a substance parameter is obtained by dividing the chemical formula weight by the sum of the squares of the numbers of the electrons belonging to each of the atoms contained in the chemical formula unit, and when the sample contains an uncertain crystalline phase having an uncertain chemical composition, through use of a value between a minimum value and a maximum value of a plurality of substance parameters respectively calculated based on a plurality of chemical compositions assumed with respect to the uncertain crystalline phase as a substance parameter of the uncertain crystalline phase, the weight ratio calculation means may calculate a weight factor of the uncertain crystalline phase based on a product of the substance parameter and the sum of the diffracted intensities corrected with respect to the Lorentz-polarization factor, caused by the uncertain crystalline phase.

(11) The quantitative phase analysis device according to the above-mentioned item (10), in which the weight ratio calculation means may use an average value of the plurality of substance parameters respectively calculated based on the plurality of chemical compositions assumed with respect to the uncertain crystalline phase as the substance parameter of the uncertain crystalline phase.

(12) The quantitative phase analysis device according to the above-mentioned item (2) or (3), in which, when a substance parameter is obtained by dividing the chemical formula weight by the sum of the squares of the numbers of the electrons belonging to each of the atoms contained in the chemical formula unit, and when the sample contains a plurality of uncertain crystalline phases each having an uncertain chemical composition, and a chemical composition of the entire plurality of uncertain crystalline phases is determined, the weight ratio calculation means may calculate a weight factor of the entire plurality of uncertain crystalline phases based on a product of a substance parameter of the entire plurality of uncertain crystalline phases and the sum of the diffracted intensities corrected with respect to the Lorentz-polarization factor, caused by the plurality of uncertain crystalline phases.

(13) The quantitative phase analysis device according to the above-mentioned item (2) or (3), in which, when a substance parameter is obtained by dividing the chemical formula weight by the sum of the squares of the numbers of the electrons belonging to each of the atoms contained in the chemical formula unit, and when the sample contains one or more crystalline phases to be identified and one uncertain crystalline phase having an uncertain chemical composition, and a chemical composition of the entire sample is determined, the weight ratio calculation means may include substance parameter calculation means for calculating a substance parameter of the uncertain crystalline phase through use of a substance parameter of the entire sample, the sum of the diffracted intensities corrected with respect to the Lorentz-polarization factor of each of the one or more crystalline phases to be identified and the uncertain crystalline phase, and a substance parameter of each of the one or more crystalline phases to be identified.

(14) The quantitative phase analysis device according to the above-mentioned item (2) or (3), in which, when a substance parameter is obtained by dividing the chemical formula weight by the sum of the squares of the numbers of the electrons belonging to each of the atoms contained in the chemical formula unit, and when the sample contains one or more crystalline phases to be identified and a plurality of uncertain crystalline phases each having an uncertain chemical composition, and a chemical composition of the entire sample is determined, the weight ratio calculation means may include substance parameter calculation means for calculating a substance parameter of the entire plurality of uncertain crystalline phases through use of a substance parameter of the entire sample, the sum of the diffracted intensities corrected with respect to the Lorentz-polarization factor of each of the one or more crystalline phases to be identified, the sum of the diffracted intensities corrected with respect to the Lorentz-polarization factor of the entire plurality of uncertain crystalline phases, and a substance parameter of each of the one or more crystalline phases to be identified.

(15) The quantitative phase analysis device according to the above-mentioned item (3), in which, when a substance parameter is obtained by dividing the chemical formula weight by the sum of the squares of the numbers of the electrons belonging to each of the atoms contained in the chemical formula unit, and when the sample contains one uncertain crystalline phase having an uncertain chemical composition, and a chemical composition of the entire sample is determined, the weight ratio calculation means may include substance parameter calculation means for calculating a weight fraction of each of the plurality of crystalline phases through use of a substance parameter of the uncertain crystalline phase, which has been calculated, and calculating the substance parameter of the uncertain crystalline phase through use of a substance parameter of the entire sample, a substance parameter of a crystalline phase other than the uncertain crystalline phase in the plurality of crystalline phases, and the calculated weight fraction of each of the plurality of crystalline phases.

(16) The quantitative phase analysis device according to the above-mentioned item (3), in which, when a substance parameter is obtained by dividing the chemical formula weight by the sum of the squares of the numbers of the electrons belonging to each of the atoms contained in the chemical formula unit, and when the sample contains one or more crystalline phases to be identified and a plurality of uncertain crystalline phases each having an uncertain chemical composition, and a chemical composition of the entire sample is determined, the weight ratio calculation means may include substance parameter calculation means for calculating a weight fraction of each of the one or more crystalline phases to be identified and a weight fraction of the entire plurality of uncertain crystalline phases through use of a substance parameter of the entire plurality of uncertain crystalline phases, which has been calculated, and calculating the substance parameter of the entire plurality of uncertain crystalline phases through use of a substance parameter of the entire sample, a substance parameter of each of the one or more crystalline phases to be identified, the calculated weight fraction of each of the one or more crystalline phases to be identified, and the calculated weight fraction of the entire plurality of uncertain crystalline phases.

(17) A quantitative phase analysis device according to one embodiment of the present invention is a quantitative phase analysis device configured to perform quantitative phase analysis of crystalline phases contained in a sample based on a powder diffraction pattern of the sample, in which, when the sample contains a plurality of crystalline phases having polymorphism of the same chemical composition, the quantitative phase analysis device may include: qualitative phase analysis result acquisition means for acquiring information on the plurality of crystalline phases; and weight ratio calculation means for calculating a weight ratio of the plurality of crystalline phases based on a weight factor through use of a sum of diffracted intensities corrected with respect to a Lorentz-polarization factor as the weight factor, in the plurality of crystalline phases acquired by the qualitative phase analysis result acquisition means.

(18) A quantitative phase analysis method according to one embodiment of the present invention may be a quantitative phase analysis method for performing quantitative phase analysis of crystalline phases contained in a sample based on a powder diffraction pattern of the sample, the quantitative phase analysis method including: a qualitative phase analysis result acquisition step of acquiring information on a plurality of crystalline phases contained in the sample; and a weight ratio calculation step of calculating a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the plurality of crystalline phases acquired in the qualitative phase analysis result acquisition step.

(19) A quantitative phase analysis program according to one embodiment of the present invention may be a quantitative phase analysis program for performing quantitative phase analysis of crystalline phases contained in a sample based on a powder diffraction pattern of the sample, the quantitative phase analysis program causing a computer to function as: qualitative phase analysis result acquisition means for acquiring information on a plurality of crystalline phases contained in the sample; and weight ratio calculation means for calculating a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the plurality of crystalline phases acquired by the qualitative phase analysis result acquisition means.

Advantageous Effects of Invention

According to the present invention, the quantitative phase analysis device, the quantitative phase analysis method, and the quantitative phase analysis program, which are capable of performing quantitative phase analysis more simply, are provided.

BRIEF DESCRIPTION OF THE DRAWINGS

FIG. 4 is a table for showing diffraction line data on mixed samples.

FIG. 5A is a table for showing quantitative phase analysis results of a first sample.

FIG. 5B is a table for showing quantitative phase analysis results of a second sample.

FIG. 5C is a table for showing quantitative phase analysis results of a third sample.

FIG. 5D is a table for showing quantitative phase analysis results of a fourth sample.

FIG. 6 are each a graph for showing dependence of quantitative phase analysis on an angle range.

FIG. 7 is a table for showing a plurality of chemical compositions assumed with respect to the unknown crystal line phase and substance parameters corresponding thereto in a first example of the present invention.

FIG. 8 is a table for showing a chemical composition, a substance parameter, and a first factor of each component in the first example of the present invention.

FIG. 9 is a table for showing quantitative phase analysis results in the first example of the present invention.

FIG. 10 is a table for showing a calculated value indicating quantification accuracy of each unknown crystalline phase in a multicomponent system.

FIG. 11 is a table for showing a value of a substance parameter of each related compound in a second example of the present invention.

FIG. 12A is a table for showing quantitative phase analysis results in the second example of the present invention.

FIG. 12B is a table for showing quantitative phase analysis results in the second example of the present invention.

FIG. 13 is a table for showing a value of a substance parameter of each related compound in a third example of the present invention.

FIG. 14 is a table for showing quantitative phase analysis results in the third example of the present invention.

FIG. 15 is a table for showing a chemical composition, a value of a second factor, a value of a third factor, and a value of a substance parameter of each mineral species in a fourth example of the present invention.

FIG. 16A is a table for showing quantitative phase analysis results in the fourth example of the present invention.

FIG. 16B is a table for showing quantitative phase analysis results in the fourth example of the present invention.

FIG. 17 is a table for showing a chemical composition, a value of a chemical formula weight, a value of a substance parameter, and a value of a weight fraction of each crystalline phase belonging to a group G2 in a fifth example of the present invention.

FIG. 18 is a table for showing a value of a factor f of each crystalline phase belonging to the group G2 and a value of a relative number (relative number of pieces) of each atom contained in the crystalline phase in the fifth example of the present invention.

FIG. 20A is a table for showing calculation results of a calculation method for a substance parameter in the sixth example of the present invention.

FIG. 20B is a table for showing calculation results of the calculation method for a substance parameter in the sixth example of the present invention.

DETAILED DESCRIPTION OF THE INVENTION

Figure 1:
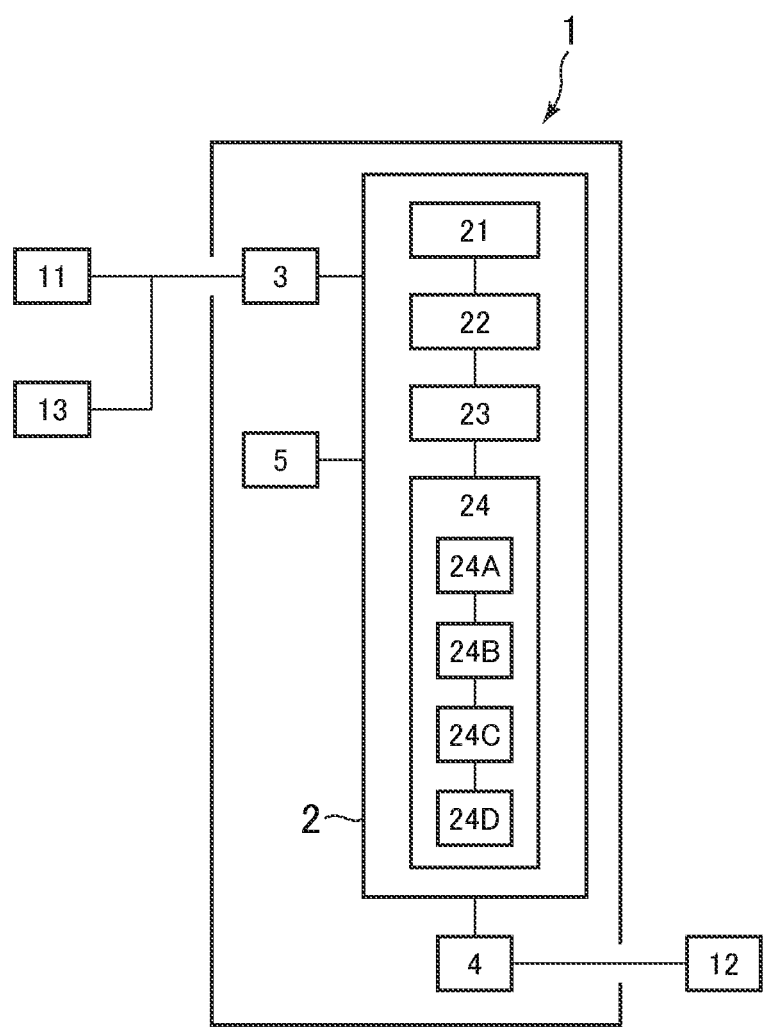
FIG. 1 is a block diagram for illustrating a configuration of a quantitative phase analysis device according to an embodiment of the present invention.

Now, an embodiment of the present invention is described with reference to the drawings. For clearer illustration, some sizes, shapes, and the like are schematically illustrated in the drawings in comparison to actual ones. However, the sizes, the shapes, and the like are merely examples, and do not limit understanding of the present invention. Further, like elements as those described relating to the drawings already referred to are denoted by like reference symbols herein and in each of the drawings, and detailed description thereof is sometimes omitted as appropriate.

FIG. 1 is a block diagram for illustrating a configuration of a quantitative phase analysis device 1 according to the embodiment of the present invention. A quantitative phase analysis method according to this embodiment is performed by the quantitative phase analysis device 1 according to this embodiment. That is, the quantitative phase analysis device 1 according to this embodiment is a device capable of simply performing quantitative phase analysis of a sample through use of the quantitative phase analysis method according to this embodiment.

The quantitative phase analysis device 1 according to this embodiment includes an analysis unit 2, an information input unit 3, an information output unit 4, and a storage unit 5. The quantitative phase analysis device 1 is achieved by a computer used in general, and further includes a read only memory (ROM) (not shown) and a random access memory (RAM) (not shown). The ROM and the RAM form internal memories of the computer. The storage unit 5 is a recording medium, and may be formed of a semiconductor memory, a hard disk drive, or other such arbitrary recording medium. In this case, the storage unit 5 is installed inside the computer, but may be installed outside the computer. The storage unit 5 may be a single recording medium, or may be formed of a plurality of recording mediums. The quantitative phase analysis device 1 is connected to an X-ray diffractometer 11 and an input device 13. The X-ray diffractometer 11 is configured to subject a sample having a powder shape to X-ray diffraction measurement to measure X-ray diffraction data on the sample and output the measured X-ray diffraction data to the information input unit 3 of the quantitative phase analysis device 1. The input device 13 is realized with a keyboard, a mouse, a touch panel, or the like. The information input unit 3 is an interface or the like to be connected to the X-ray diffractometer 11 and the input device 13. The analysis unit 2 is configured to acquire the X-ray diffraction data from the information input unit 3 and subject the X-ray diffraction data to preprocessing to generate a powder diffraction pattern of the sample. In this case, the preprocessing refers to processing, for example, smoothing of data, removal of a background, or removal of a $K\alpha2$ component. The powder diffraction pattern generated by the analysis unit is input and stored in the storage unit 5. The X-ray diffractometer 11 may include an analysis unit (data processing unit), and the analysis unit of the X-ray diffractometer 11 may subject X-ray diffraction data to be measured to preprocessing to generate a powder diffraction pattern of the sample and output the powder diffraction pattern of the sample to the information input unit 3 of the quantitative phase analysis device 1. The analysis unit 2 is configured to acquire the powder diffraction pattern of the sample from the storage unit 5 (or the information input unit 3) and perform quantitative phase analysis of crystalline phases contained in the sample based on the powder diffraction pattern to output a weight ratio of the crystalline phases subjected to quantitative phase analysis to the information output unit 4 as an analysis result. The information output unit 4 is an interface or the like to be connected to a display device 12 and is configured to output the weight ratio of the crystalline phases to the display device 12. The display device 12 is configured to display the analysis result of the quantitative phase analysis.

Figure 2:
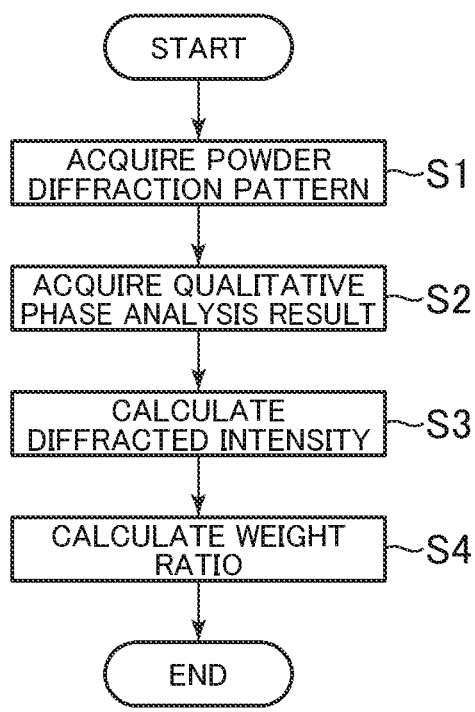
FIG. 2 is a flowchart for illustrating a quantitative phase analysis method according to the embodiment of the present invention.

FIG. 2 is a flowchart for illustrating the quantitative phase analysis method according to this embodiment. The analysis unit 2 of the quantitative phase analysis device 1 includes a powder diffraction pattern acquisition unit 21, a qualitative phase analysis result acquisition unit 22, a diffracted intensity calculation unit 23, and a weight ratio calculation unit 24, and those units are means for executing each step of the quantitative phase analysis method described below. Further, a quantitative phase analysis program according to this embodiment is a program for causing the computer to function as the respective means.

[Step S1: Powder Diffraction Pattern Acquisition Step]

A powder diffraction pattern of a sample is acquired (S1: powder diffraction pattern acquisition step). The powder diffraction pattern of the sample is stored in the storage unit 5. Alternatively, as described above, the X-ray diffractometer 11 may include an analysis unit (data processing unit) and subject X-ray diffraction data on a sample to be measured to preprocessing to generate a powder diffraction pattern of the sample. Then, the X-ray diffractometer 11 may output the powder diffraction pattern of the sample to the information input unit 3 of the quantitative phase analysis device 1. The analysis unit 2 of the quantitative phase analysis device 1 acquires the powder diffraction pattern of the sample from the storage unit 5 (or the information input unit 3). In the powder diffraction pattern, a horizontal axis represents a diffraction angle $2\theta$ indicating a peak position, and a vertical axis represents a spectrum indicating an intensity of a diffraction X-ray. In this case, the diffraction angle $2\theta$ is an angle formed by an incident X-ray direction and a diffraction X-ray direction. The X-ray diffraction data on the sample measured by the X-ray diffractometer 11 may be input to the information input unit 3 or stored in the storage unit 5. In this case, the analysis unit 2 acquires the X-ray diffraction data on the sample from the information input unit 3 or the storage unit 5 and subjects the X-ray diffraction data on the sample to preprocessing to generate the powder diffraction pattern of the sample.

[Step S2: Qualitative Phase Analysis Result Acquisition Step]

Information on a plurality of crystalline phases contained in the sample is acquired (S2: qualitative phase analysis result acquisition step). The analysis unit 2 identifies crystalline phases based on the positions and the intensities of a diffraction lines (peaks) of the powder diffraction pattern of the sample acquired in the powder diffraction pattern acquisition step S1. That is, the analysis unit 2 acquires information on a plurality of crystalline phases contained in the sample by qualitative phase analysis. In this case, the information on the crystalline phases contains chemical compositions thereof, information on polymorphism when the crystalline phases have polymorphism having different crystal structures, and a plurality of peak positions of powder diffraction patterns of the crystalline phases. The information may further contain intensities at the plurality of peak positions of the powder diffraction patterns of the crystalline phases.

Based on the peak positions and the peak intensities of the powder diffraction pattern of the sample acquired in the powder diffraction pattern acquisition step S1 according to this embodiment, the analysis unit 2 acquires information on the plurality of crystalline phases contained in the sample by subjecting the sample to qualitative phase analysis. However, the present invention is not limited thereto, and the information input unit 3 may acquire the information on the plurality of crystalline phases contained in the sample, which is a result of the qualitative phase analysis of the sample, from the input device 13.

[Step S3: Diffracted Intensity Calculation Step]

Diffracted intensities of a plurality of diffraction lines in each of the plurality of crystalline phases contained in the sample are calculated based on the powder diffraction pattern of the sample (S3: diffracted intensity calculation step). In this case, the diffracted intensity includes an integrated intensity of a diffraction line (peak) and a peak intensity (peak height) of the diffraction line. The diffracted intensity calculated in this case may be an integrated intensity or a peak intensity. The integrated intensity is desired from the viewpoint that quantitative phase analysis with higher accuracy can be performed, but the peak intensity can be determined more simply. Now, the case where the diffracted intensity is an integrated intensity is described.

Integrated intensities of the plurality of diffraction lines included in the powder diffraction pattern are determined by subjecting the powder diffraction pattern of the sample to a pattern decomposition method, for example, a whole-powder pattern decomposition method or an individual profile fitting method. It is determined whether or not the determined integrated intensities of the plurality of diffraction lines belong to the plurality of crystalline phases contained in the sample. With this, diffracted intensities of the plurality of diffraction lines in each of the plurality of crystalline phases contained in the sample are obtained.

In qualitative phase analysis, of the plurality of crystalline phases contained in the sample, unidentified unknown crystalline phases may exist. Therefore, when there are diffraction lines that cannot be determined regarding which diffraction lines belong to the identified crystalline phases, it is only necessary that those diffraction lines be collected in one group as unknown crystalline phases.

Further, in general, a crystalline phase has a plurality of diffraction lines. When a plurality of crystalline phases are contained in a sample, there may be the case where diffraction lines of two or more different crystalline phases are superimposed on each other or exist extremely closely to each other, and diffraction lines to be observed cannot be decomposed into individual diffraction lines. A decomposition processing method regarding how to distribute diffracted intensities of diffraction lines observed as one diffraction line to two or more corresponding crystalline phases in such case is described later.

[Step S4: Weight Ratio Calculation Step]

A weight ratio of the plurality of crystalline phases is calculated based on sums of diffracted intensities corrected with respect to Lorentz-polarization factors, chemical formula weights, and sums of squares of numbers of electrons belonging to each of atoms contained in chemical formula units, in the plurality of crystalline phases, respectively (weight ratio calculation step).

Here, when K (K represents an integer of 2 or more) crystalline phases are contained in a sample, a weight factor $W_k$ of a k-th (k represents an integer of 1 or more and K or less) crystalline phase is represented by the following numerical expression 3.

$$W_k = M_k \left( \sum_{j=1}^{N_k} \frac{I^{obs}_{jk}}{Lp_{jk}} \right) \left( \sum_{i=1}^{A_k} n^2_{ik} \right)^{-1} \quad \text{[Math. 3]}$$

That is, the weight factor $W_k$ is obtained by dividing a product of the sum of diffracted intensities subjected to the Lp correction and the chemical formula weight by the sum of squares of numbers of electrons belonging to each of atoms contained in the chemical formula unit. In this case, $I^{obs}_{jk}$ represents an observed integrated intensity of a j-th diffraction line of the k-th crystalline phase calculated based on the powder diffraction pattern obtained by measurement. $Lp_{jk}$ represents the Lp factor as described above, which is a factor dependent on the peak position $2\theta$. Thus, $I^{obs}_{jk}/Lp_{jk}$ represents a diffracted intensity (integrated intensity in this case) subjected to correction with respect to the Lp factor (Lp correction). $M_k$ represents a chemical formula weight of the k-th crystalline phase. $n_{ik}$ represents the number of electrons belonging to each of atoms in a chemical formula unit of the k-th crystalline phase, and $A_k$ represents a total number of atoms in the chemical formula unit of the k-th crystalline phase.

$\Sigma I^{obs}_{jk}/Lp_{jk}$ represents a sum of the diffracted intensities subjected to the Lp correction, and $N_k$ represents the number of diffraction lines of the k-th crystalline phase. In this case, $N_k$ ideally represents a total number of diffraction lines of the k-th crystalline phase. However, actually, the range of $2\theta$ of the powder diffraction pattern to be observed is finite. Therefore, the sum means a summation (sum), and $N_k$ may be the number of diffraction lines within the range of $2\theta$ selected by a user. Further, there may be diffraction lines that are not included in the sum, as necessary, in spite of the fact that the diffraction lines actually exist.

As described above, there is a case where diffraction lines of two or more different crystalline phases are superimposed on each other or exist extremely closely to each other, and diffraction lines to be observed cannot be decomposed into individual diffraction lines. When such diffraction lines are assumed to be a superimposed diffraction line, in the case where the powder diffraction pattern of the sample includes the superimposed diffraction line, it is desired that the diffracted intensity of the superimposed diffraction line be distributed to two or more corresponding crystalline phases.

A weight ratio of K crystalline phases contained in the sample can be calculated based on the weight factor $W_k$. In this case, the weight ratio of the K crystalline phases may be calculated as $W_1:W_2: \ldots :W_K$. Alternatively, it may be possible to select a part of the K crystalline phases and determine a weight ratio thereof. Further, when the sample does not contain an amorphous component, and all the crystalline phases contained in the sample are subjected to qualitative phase analysis, the entire sample can be relatively represented by a sum $\Sigma W_k$ for k ranging from 1 to K. Thus, a weight fraction $w_k$ of the k-th crystalline phase can be represented by the following numerical expression 4.

$$w_k = W_k \Bigg/ \sum_{k=1}^{K} W_k = M_k \left( \sum_{j=1}^{N_k} \frac{I^{obs}_{jk}}{Lp_{jk}} \right) \quad \text{[Math. 4]}$$

$$\left( \sum_{i=1}^{A_k} n^2_{ik} \right)^{-1} \Bigg/ \sum_{k=1}^{K} M_k \left( \sum_{j=1}^{N_k} \frac{I^{obs}_{jk}}{Lp_{jk}} \right) \left( \sum_{i=1}^{A_k} n^2_{ik} \right)^{-1}$$

In this case, $w_k$ satisfies a normalization condition $\Sigma w_k=1$ (sum for k ranging from 1 to K). That is, the weight ratio in the present specification may be a weight ratio of a plurality of crystalline phases or may be a ratio (weight fraction) of one of a plurality of crystalline phases with respect to the entire crystalline phases.

Further, even when the sample contains an amorphous component or an unidentified unknown crystalline phase, in the case where the weight fraction of each of those components is relatively small, a weight fraction of a certain crystalline phase can be determined by the numerical expression 4 by ignoring those components. Even when the weight fraction of each of those components cannot be ignored, a weight fraction of a certain crystalline phase may be determined by the numerical expression 4, although the accuracy decreases, by calculating the weight fraction without including those components into the denominator of the numerical expression 4.

When the sample contains an unidentified unknown crystalline phase, the weight factor $W_k$ of the unknown crystalline phase may be calculated based on the chemical compositions of a plurality of identified crystalline phases. The weight fraction $w_k$ of the identified crystalline phase can be determined by the numerical expression 4 through use of the weight factor $W_k$ of the unknown crystalline phase obtained by calculation. Similarly, the weight fraction $w_k$ of the unknown crystalline phase can be determined by the numerical expression 4. Although the accuracy slightly decreases as compared to the case where the unknown crystalline phase can be identified, the weight fraction $w_k$ of the identified crystalline phase can be determined with higher accuracy as compared to the case where the weight factor $W_k$ of the unknown crystalline phase is not included in the denominator of the numerical expression 4. In particular, in a related-art quantitative phase analysis method, it is difficult to determine the weight fraction $w_k$ of an identified crystalline phase when the sample contains an unknown crystalline phase, but the quantitative phase analysis method according to this embodiment exhibits remarkable effects.

Now, a method of calculating the weight factor $W_k$ of the unknown crystalline phase is specifically described. As represented by the numerical expression 3, the weight factor $W_k$ includes three factors. The first factor is a "sum of diffracted intensities subjected to the Lp correction" ($\Sigma I^{obs}_{jk}/Lp_{jk}$) The second factor is a chemical formula weight $M_k$. The third factor is a "sum of squares of numbers of electrons belonging to each of atoms contained in the chemical formula unit." Here, the third factor is represented by $E_k$ ($=\Sigma n_{jk}^2$), and a value obtained by dividing the second factor by the third factor is assumed to be a substance parameter $a_k$ ($=M_k/E_k$).

Diffraction lines (the above-mentioned one group) determined not to belong to the identified crystalline phases are assumed to be diffraction lines of the unknown crystalline phase, and the first factor ($\Sigma I^{obs}_{jk}/Lp_{jk}$) of the numerical expression 3 is calculated with respect to the intensities of such diffraction lines. The second factor ($M_k$) and the third factor ($E_k$) of the numerical expression 3 are required for calculation of the weight factor $W_k$ of the unknown crystalline phase, but the weight factor $W_k$ of the unknown crystalline phase is calculated through use of substitute values appropriate for those factors. It is desired that those substitute values be based on the chemical compositions of the plurality of identified crystalline phases. Realistic substitute values can be simply obtained, for example, by substituting an average value of the second factors of the plurality of identified crystalline phases for the second factor ($M_k$) of the unknown crystalline phase and similarly substituting an average value of the third factors of the plurality of identified crystalline phases for the third factor ($E_k$) of the unknown crystalline phase. Alternatively, realistic substitute values can also be simply obtained by substituting an average value of substance parameters of the plurality of identified crystalline phases for the substance parameter $a_k$ ($=M_k/E_k$) of the unknown crystalline phase. As described above, the weight fraction $w_k$ of each of the plurality of identified crystalline phases and the unknown crystalline phase can be determined by the numerical expression 4 through use of the weight factor $W_k$ of the unknown crystal line phase obtained by calculation. The substitute values are not limited to the above-mentioned examples, and it is only necessary that the substitute values be based on the chemical compositions of the plurality of identified crystalline phases. The method of calculating the weight factor $W_k$ of the unknown crystalline phase is described above. Description is later given of a method of determining the weight factor $W_k$ with satisfactory accuracy even when the sample contains a substance having an uncertain chemical composition, for example, when the sample contains an unknown crystalline phase that is not identified by qualitative phase analysis.

A distribution processing method for a diffracted intensity of a superimposed diffraction line when the powder diffraction pattern of the sample includes diffraction lines of two or more crystalline phases but includes a superimposed diffraction line that cannot be decomposed by analysis is described below. Distribution of the diffracted intensity of the superimposed diffraction line to be observed to the two or more crystalline phases may be performed with respect to the diffracted intensity ($I^{obs}_{jk}/Lp_{jk}$) subjected to the Lp correction. Alternatively, distribution may be performed with respect to the diffracted intensity $I^{obs}_{jk}$ before being subjected to the Lp correction, and then the Lp correction may be performed.

A first distribution processing method according to this embodiment is equi-partition processing. The diffracted intensity of the superimposed diffraction line to be observed is equally divided by the number of two or more corresponding crystalline phases, and the divided diffracted intensities are equally distributed to be defined as diffracted intensities of the diffraction lines of the two or more corresponding crystalline phases. For example, when L (L represents a natural number of 2 or more) diffraction lines are superimposed on a superimposed diffraction line (peak) to be observed, in the case where the diffracted intensity of one entire diffraction line to be observed is I, each diffracted intensity (j represents any integer of 1 or more and L or less) is distributed so as to satisfy $I_j=I/L$. Note that $\Sigma I_j=I$. The equi-partition processing is a simple method with high practicability. For example, even when the sample contains an amorphous component or when the sample contains an unidentified unknown crystalline phase, the equi-partition processing can be easily applied, and hence the general versatility thereof is also high. A second distribution processing method according to this embodiment is a method involving distributing a diffracted intensity in proportion to a volume fraction. The detail thereof is described below.

Figure 3:
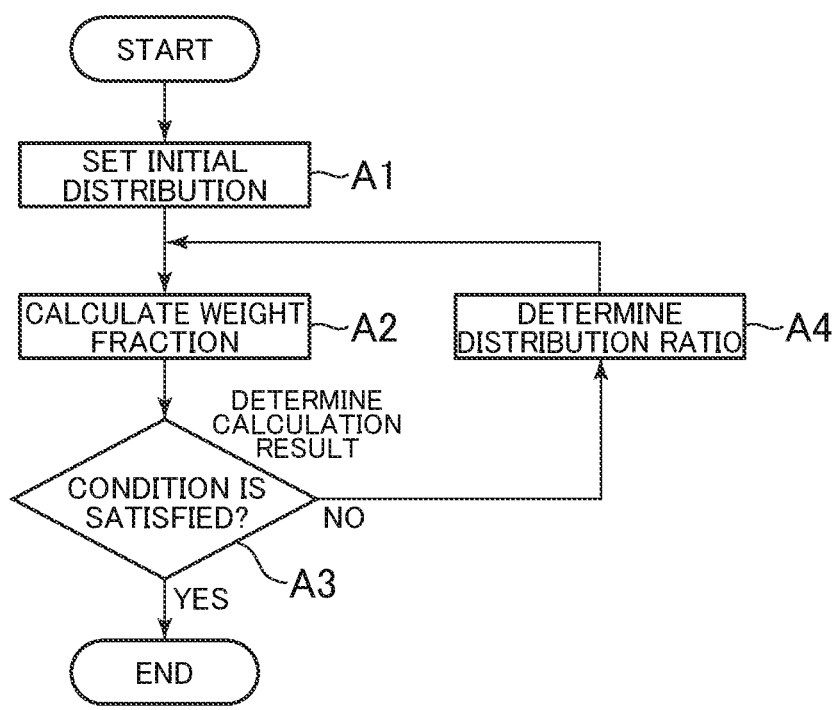
FIG. 3 is a flowchart for illustrating an example of a weight ratio calculation step S4 according to the embodiment of the present invention.

FIG. 3 is a flowchart for illustrating an example of the weight ratio calculation step S4 according to this embodiment. In this case, the weight fraction $w_k$ of each of a plurality of crystalline phases is calculated by the method involving distributing a diffracted intensity in proportion to a volume fraction. The weight ratio calculation unit 24 of the analysis unit 2 includes an initial distribution setting unit 24A, a weight fraction calculation unit 24B, a calculation result determination unit 24C, and a distribution ratio determination unit 24D. Those units are means for executing each step of the weight ratio calculation step S4 described below.

[Step A1: Initial Distribution Setting Step]

The diffracted intensity of the superimposed diffraction line is distributed to two or more corresponding crystalline phases based on an initial setting condition (A1: initial distribution setting step). In this case, the initial setting condition is equi-partition processing. The equi-partition processing is simple and effective, and hence is used also in an initial stage of structural analysis. However, the present invention is not limited thereto, and a diffracted intensity may be distributed under another initial setting condition. When the powder diffraction pattern of the sample includes a plurality of superimposed diffraction lines (peaks), distribution of a diffracted intensity is performed with respect to each of the superimposed diffraction lines.

[Step A2: Weight Fraction Calculation Step]

A weight fraction of each of a plurality of crystalline phases is calculated through use of a diffracted intensity distributed to two or more corresponding crystalline phases (A2: weight fraction calculation step). The weight fraction of each crystalline phase can be determined by the numerical expression 4.

[Step A3: Calculation Result Determination Step]

It is determined whether or not the weight fraction of each of the plurality of crystalline phases calculated in the weight fraction calculation step satisfies a predetermined condition (A3: calculation result determination step). When the predetermined condition is satisfied, the weight ratio calculation step S4 is finished. When the predetermined condition is not satisfied, the flow proceeds to a distribution ratio determination step A4. In this case, the predetermined condition is, for example, that a difference between a current calculation result and a previous calculation result is smaller than a set value, and it can be determined that the calculation of a weight fraction is sufficiently converged. Therefore, in the first round calculation, the predetermined condition is not satisfied, and the flow proceeds to the distribution ratio determination step A4 without fail.

[A4: Distribution Ratio Determination Step]

A diffracted intensity of a superimposed diffraction line is distributed to two or more corresponding crystalline phases based on the weight fraction of each of the plurality of crystalline phases calculated in the weight fraction calculation step A2 (A4: distribution ratio determination step). In this case, distribution of a diffracted intensity of a superimposed diffraction line is performed in proportion to the volume fraction $v_k$. After the distribution ratio determination step A4, the flow again proceeds to the weight fraction calculation step A2. In the weight fraction calculation step A2, a weight fraction is calculated.

The volume fraction $v_k$ is based on the weight fraction $w_k$ and is determined by $v_k = w_k/d_k$ ($d_k$ represents a density). The diffracted intensity of a diffraction line is proportional to the volume fraction $v_k$, and it is suitable that the diffracted intensity be proportionally distributed based on the volume fraction $v_k$. In order to determine the volume fraction $v_k$, a density $d_k$ of a crystalline phase thereof is required, and it is desired that information on a crystalline phase acquired in the qualitative phase analysis result acquisition step S2 contain a density of the crystalline phase.

It is desired that distribution of a diffracted intensity of a superimposed diffraction line be performed in proportion to the volume fraction $v_k$. However, the present invention is not limited thereto, and it is only necessary that distribution be based on the weight fraction $w_k$. For example, when density information has not been acquired with respect to a part or an entirety of two or more corresponding crystalline phases, it is only necessary that the density of the crystalline phase, in which the density information has not been acquired, be assumed to be 1.0 although the accuracy of an analysis result decreases. When the densities of all the crystalline phases are set to 1.0, distribution is performed in proportion to the weight fraction $w_k$. The density of the crystalline phase, in which the density information has not been acquired, may be assumed to be an average value of other crystalline phases in which the density information has been acquired.

When the operation in the distribution ratio determination step A4 is completed, the flow proceeds to the weight fraction calculation step A2. The operations in the distribution ratio determination step A4 and the weight fraction calculation step A2 are repeated until it is determined that the predetermined condition is satisfied in the calculation result determination step A3. In actual calculation, calculation is repeated about five to ten times.

The quantitative phase analysis method according to this embodiment is described above. The quantitative phase analysis method according to this embodiment exhibits remarkable effects as described below. First, there is given simplicity. Belonging of diffraction lines included in the powder diffraction pattern can be confirmed by qualitative phase analysis, and quantitative phase analysis can be performed as long as the chemical compositions of a plurality of crystalline phases are known, with the result that calculation is easy. Secondly, there is given independence. The related-art quantitative phase analysis method requires any of data such as an RIR value in ICDD-PDF and a crystal structure database. However, in the quantitative phase analysis method according to this embodiment, quantitative phase analysis can be performed without using the above-mentioned data. Thirdly, there is given extendibility. Even when the sample contains an impurity component, quantitative phase analysis can be performed. Further, the PONCS method requires a sample of a single crystalline phase (standard sample), but the quantitative phase analysis according to this embodiment can be applied to the PONKCS method. Fourthly, there is given accuracy. In the quantitative phase analysis method according to this embodiment, diffracted intensities of a large number of diffraction lines included in the powder diffraction pattern are used for analysis. As compared to the case where analysis is performed through use of an intensity of a single peak, accuracy is enhanced, and a sample having orientation can also be analyzed.

Next, analysis results of the quantitative phase analysis method according to this embodiment are described. Four mixed samples (first sample to fourth sample) in which each mixing ratio is known are prepared. Each mixed sample is measured for a powder diffraction pattern, and quantitative phase analysis is performed by the quantitative phase analysis method according to this embodiment. All the four mixed samples are each formed of three crystalline phases (three components).

FIG. 4 is a table for showing diffraction line data on the mixed samples. Each of the four mixed samples is subjected to X-ray diffraction measurement to provide a powder diffraction pattern. The measurement range is $2\theta \leq 120°$. In FIG. 4, the number of diffraction lines (reflection) included in such powder diffraction pattern and the number of diffraction lines belonging to each component are shown. The "number" represents the number of diffraction lines decomposed through use of a profiling fitting method. The "superimposition" represents the number of superimposed diffraction lines. The "%" represents a ratio of the superimposed diffraction lines with respect to the number of diffraction lines of each component.

As shown in FIG. 4, in any of the mixed samples, superimposed diffraction lines exist. For example, in the case of the first sample, a total number of the superimposed diffraction lines is 10, and a total number of diffraction lines decomposed by analysis is 73. Each superimposed diffraction line includes diffraction lines of two crystalline phases (two components) superimposed on one another. Therefore, when the diffraction lines of the powder diffraction pattern are completely decomposed, the number of diffraction lines becomes 83.

FIG. 5A to FIG. 5D are each a table for showing quantitative phase analysis results of the first sample to the fourth sample. The powder diffraction pattern includes superimposed diffraction lines. Therefore, quantitative phase analysis is performed with respect to distribution of a diffracted intensity of each of the superimposed diffraction lines through use of both the first distribution processing method (equi-partition processing: hereinafter referred to as "first method") and the second distribution processing method (distribution proportional to a volume fraction: hereinafter referred to as "second method"). Those quantitative analyses are performed through use of data within a measurement range of $2\theta \leq 90°$. Further, for comparison, quantitative phase analysis is performed by the Rietveld method and the RIR quantification method using an RIR value. The mixing value represents an actual mixing ratio of components, and quantitative phase analysis results of each of the methods and a difference therebetween are shown in FIG. 5A to FIG. 5D.

The first sample contains a crystalline phase (Calcite $CaCO_3$) having strong orientation. The RIR quantification method is considered to be unsuitable for quantitative phase analysis of a mixed sample containing a crystalline phase having strong orientation. As shown in FIG. 5A, according to the analysis results of this embodiment, analysis can be performed with a small error in both the first method and the second method as compared to that of the RIR quantification method, and it is considered that quantitative phase analysis can be performed with high accuracy even with respect to a sample containing a crystalline phase having strong orientation in this embodiment. There is no substantial difference in analysis result between the first method and the second method.

The second sample contains crystalline phases having scattering power of the same degree. The third sample contains a crystalline phase having strong scattering power. As shown in FIG. 5B and FIG. 5C, the analysis results of this embodiment have the same degree of an error or a smaller error in both the first method and the second method, as compared to those of the Rietveld method and the RIR quantification method. Thus, satisfactory results are shown.

The fourth sample contains a minor component. Even in such case, the analysis result of the second method has the same degree of an error as that of the Rietveld method and has an error smaller than that of the RIR quantification method. Meanwhile, the analysis result of the first method has an error larger than that of the second method. When Anatase $TiO_2$ that is a minor component is superimposed on diffraction lines of another component with a larger amount, this case is caused by the large influence of equal distribution of the diffracted intensity of the corresponding superimposed diffraction line. Meanwhile, in the second method, in spite of the fact that a large error occurs in the first round calculation of a weight fraction, the error is converged to be small by performing calculation repeatedly. Thus, the effectiveness of the second method can be confirmed.

FIG. 6 are each a graph for showing dependence of quantitative phase analysis on an angle range. The vertical axis of FIG. 6 represents the weight fraction $w_k$, and the horizontal axis thereof represents an angle range of $2\theta$ in which quantitative phase analysis is performed. For example, 70° means that analysis is performed within an angle range of $2\theta \leq 70°$. FIG. 6(a) is a graph for showing the analysis result of the first method, and FIG. 6(b) is a graph for showing the analysis result of the second method. Similar dependence (not shown) is confirmed also in the first sample to the third sample. In any of the cases, there is a sign of convergence at $70° \leq 2\theta$, and it can be determined that the weight fraction is sufficiently converged at $80° \leq 2\theta$. Thus, the angle range of $2\theta$ in which quantitative phase analysis is performed is desirably 70° or more, more desirably 80° or more.

As shown in FIG. 6(b), in the second method, the analysis result is converged from a small angle range, that is, the angle range of $2\theta$ of 50° or less. Meanwhile, as shown in FIG. 6(a), in the first method, the weight fraction abruptly changes in the vicinity of the angle range of $2\theta$ of from 50° to 70°. It is considered that this change is caused by the influence of the emergence of a superimposed diffraction line. The analysis result of the quantitative phase analysis method according to this embodiment is described above.

Next, the theory of the quantitative phase analysis method according to this embodiment is described. In the quantitative phase analysis method according to this embodiment, the fact that the weight factor $W_k$ and the weight fraction $w_k$ are represented by the numerical expressions 3 and 4, respectively, is used. The numerical expression 4 is derived as follows. The integrated intensity $I_{jk}$ of the diffraction line represented by the numerical expression 1 and the observed integrated intensity $I^{obs}_{jk}$ represented by the numerical expression 4 are represented by the following numerical expression 5 through use of a common scale factor S.

$$I_{jk} = S \cdot I^{obs}_{jk} \quad \text{[Math. 5]}$$

$\Sigma I^{obs}_{jk}/Lp_{jk}$ of the observed integrated intensity subjected to the Lp correction is determined with respect to the reflection in a $2\theta$ range to be measured, and from $\Sigma I^{obs}_{jk}/Lp_{jk}$ and the numerical expression 1, $v_k$ is represented by the following numerical expression 6.

$$v_k = S \frac{\mu}{Q} U_k^2 \sum_{j=1}^{N_k} \frac{I^{obs}_{jk}}{Lp_{jk}} \bigg/ \sum_{j=1}^{N_k} m_{jk} |F_{jk}|^2 \quad \text{[Math. 6]}$$

When a density is represented by $d_k$, the density $d_k$ is given by $d_k = Z_k M_k / U_k$. Here, $Z_k$ represents the number of chemical formula units. Thus, based on the numerical expression 6, $V_k d_k$ is represented by the following numerical expression 7.

$$v_k d_k = S \frac{\mu}{Q} Z_k M_k U_k \sum_{j=1}^{N_k} \frac{I^{obs}_{jk}}{Lp_{jk}} \bigg/ \sum_{j=1}^{N_k} m_{jk} |F_{jk}|^2 \quad \text{[Math. 7]}$$

Here, the denominator of the numerical expression 7 is rewritten through use of a value at an origin of a Patterson function P (u, v, w). That is, the denominator of the numerical expression 7 is represented by the following numerical expression 8.

$$\sum_{j=1}^{N_k} m_{jk} |F_{jk}|^2 = U_k P(0) \qquad [\text{Math. 8}]$$

Here, when the amount proportional to P(0) is represented by $P_k$, $P_k$ is approximated by the following numerical expression 9.

$$P_k = Z_k \sum_{i=1}^{A_k} n_{ik}^2 \qquad [\text{Math. 9}]$$

$P_k$ can be approximated by the numerical expression 9 for the same reason that the integrated intensity and the peak intensity (height of the peak) of the diffraction line have a substantially proportional relationship in the X-ray diffraction. Thus, the numerical expression 9 is represented by the following numerical expression 10.

$$v_k d_k = S \frac{\mu}{Q} M_k \sum_{j=1}^{N_k} \frac{I_{jk}^{obs}}{Lp_{jk}} \bigg/ \sum_{i=1}^{A_k} n_{ik}^2 \qquad [\text{Math. 10}]$$

The weight factor $W_k$ represented by the numerical expression 3 is proportional to $v_k d_k$ represented by the numerical expression 10. Further, the weight fraction $w_k$ represented by the numerical expression 4 is defined by the following numerical expression 11, and hence the numerical expression 4 is given.

$$w_k = v_k d_k \bigg/ \sum_{k=1}^{K} v_k d_k \qquad [\text{Math. 11}]$$

Thus, the weight factor $W_k$ and the weight fraction $w_k$ are derived. The theory of the quantitative phase analysis method according to this embodiment is described above.

Now, description is given of a method of determining the weight factor $W_k$ with satisfactory accuracy even when the sample contains an uncertain crystalline phase having an uncertain chemical composition, for example, when the sample contains an unknown crystalline phase that is not identified by qualitative phase analysis.

Here, as described above, when it is assumed that the weight factor $W_k$ represented by the numerical expression 3 includes three factors, the first factor is $S_k = \Sigma I^{obs}_{jk}/Lp_{jk}$, and a value obtained by dividing the second factor ($M_k$) by the third factor ($E_k = \Sigma n_{ik}^2$) is the substance parameter $a_k$ ($=M_k/E_k$), the weight factor $W_k$ represented by the numerical expression 3 is given by the following numerical expression 12.

$$W_k = a_k S_k \qquad [\text{Math. 12}]$$

Further, the weight fraction $w_k$ represented by the numerical expression 4 is given by the following numerical expression 13.

$$w_k = a_k S_k \bigg/ \sum_{k'=1}^{K} a_{k'} S_{k'} \qquad [\text{Math. 13}]$$

Here, the first factor $S_k$ is a physical quantity determined by measurement (observation), and the substance parameter $a_k$ is a physical quantity specific to a crystalline phase (substance). Therefore, the substance parameter may be called a crystalline phase factor. Even when the number $n_{ik}$ of electrons belonging to each atom contained in the second factor $M_k$ or the third factor $E_k$ cannot be specified regarding a certain substance, in the case where the substance parameter $a_k$ can be estimated, the weight factor $W_k$ of the crystalline phase (substance) can be determined with satisfactory accuracy by calculating a product of the first factor $S_k$ determined by measurement and the substance parameter $a_k$.

The inventors of the present invention have found the following. Even when the sample contains a crystalline phase (uncertain crystalline phase) having an uncertain chemical composition, there area large number of cases in which the chemical composition of such substance can be assumed to be any of a plurality of chemical compositions in synthesis or acquisition of the sample, and the variation (standard deviation) of a value of the substance parameter $a_k$ is relatively small in a plurality of crystalline phases to be assumed. For example, when the sample contains an unknown crystalline phase that is not identified by qualitative phase analysis, the unknown crystalline phase is an uncertain crystalline phase. There are a large number of cases in which main contained elements of an unknown crystalline phase synthesized as a byproduct at the time of synthesis of the sample can be presumed, and when the main contained elements are presumed, a plurality of chemical compositions can be assumed with respect to the uncertain crystalline phase. Thus, the weight factor $W_k$ can be determined with satisfactory accuracy by using a value between a minimum value and a maximum value in a plurality of substance parameters, respectively calculated based on the plurality of chemical compositions to be assumed, as a substitute value of the substance parameter $a_k$ of the uncertain crystalline phase. The substitute value may be an intermediate value between the minimum value and the maximum value. It is more desired that the substitute value be an average value of a plurality of substance parameters to be calculated.

First Example

The quantitative phase analysis of one uncertain crystalline phase in a multicomponent system is described as a first example. In this case, the sample is a $Fe_2O_3$—$TiO_2$-based composite. In the first example, when the sample contains an uncertain crystalline phase having an uncertain chemical composition, the sample containing the uncertain crystalline phase is quantified. When such synthesis is performed, the generation of $FeTiO_3$ (Ilmenite) and $Fe_2TiO_4$ and the presence of a peak of the uncertain crystalline phase are confirmed. According to the determination based on a reagent to be used for synthesis, elements other than Fe and Ti cannot be considered as main contained elements of the uncertain crystalline phase, and the uncertain crystalline phase is assumed to be a compound related to the $Fe_2O_3$—$TiO_2$ system.

FIG. 7 is a table for showing a plurality of chemical compositions to be assumed with respect to the uncertain crystalline phase and the substance parameters $a_k$ corresponding thereto in the first example of the present invention. In FIG. 7, in addition to the values of the substance parameters $a_k$ corresponding to seven chemical compositions to be assumed with respect to the uncertain crystalline phase, an average value of the substance parameters $a_k$ of those seven chemical compositions is shown together with a standard deviation described in parentheses. The standard deviation is 0.00632, and thus the substance parameters $a_k$ of the seven chemical compositions each have an extremely small variation with respect to the average value of 0.10696 of the substance parameters $a_k$.

FIG. 8 is a table for showing the chemical composition, the substance parameter $a_k$, and the first factor $S_k$ of each component in the first example of the present invention. As shown in FIG. 8, it is assumed that the substance parameters $a_k$ of the identified two crystalline phases $FeTiO_3$ and $Fe_2TiO_4$ are known, but the substance parameter $a_k$ of the uncertain crystalline phase is not known. Each of the first factors $S_k$ is determined based on an observed integrated intensity.

FIG. 9 is a table for showing quantitative phase analysis results in the first example of the present invention. A weight fraction $w_k^{AV}$ represents the case (second column of FIG. 9) of determining each weight fraction $w_k$ through use of the numerical expression 13, with the average value of 0.10696 of the substance parameters $a_k$ shown in FIG. 7 being the substance parameter $a_k$ of the uncertain crystalline phase. Further, in the later analysis, the uncertain crystalline phase was found to be residual $Fe_2O_3$, and a weight fraction $w_k^{True}$ represents the case (third column of FIG. 9) of determining each weight fraction $w_k$ through use of the numerical expression 13, with the substance parameter $a_k$ of the crystalline phase determined to be the uncertain crystalline phase being the value of 0.10343 of the substance parameter $a_k$ of $Fe_2O_3$. When a difference between the above-mentioned cases is calculated, the error of a quantitative value falls within a range of from 0.02% to 0.04%. Thus, it is apparent that quantification can be performed with accuracy sufficiently high for practical use.

As described above, it is shown that the effect of the error of the substance parameter $a_k$ (crystalline phase factor) on the error of the weight fraction $w_k$ is extremely small. Now, this result is further generally considered from the law of propagation of errors, and the validity of the results is discussed.

In general, when variables each have errors $\sigma(x_1)$, $\sigma(x_2)$, $\sigma(x_3) \ldots \sigma(x_n)$ in a function of many variables $y=f(x_1, x_2, x_3 \ldots x_n)$, an error $\sigma(y)$ of y is given by the following numerical expression 14 when each variable is independent.

$$\sigma^2(y) = \left(\frac{\partial f}{\partial x_1}\right)^2 \sigma^2(x_1) + \left(\frac{\partial f}{\partial x_2}\right)^2 \sigma^2(x_2) + \cdots + \left(\frac{\partial f}{\partial x_n}\right)^2 \sigma^2(x_n) \quad [\text{Math. 14}]$$

Here, only an error of the substance parameter $a_k$ is considered in the weight fraction $w_k$ represented by the numerical expression 13. When the numerical expression 13 is subjected to partial differentiation with respect to the substance parameter $a_k$, the following numerical expression 15 is obtained.

$$\frac{\partial w_k}{\partial a_k} = \frac{w_k(1-w_k)}{a_k} \quad [\text{Math. 15}]$$

Further, when the numerical expression 13 is subjected to partial differentiation with respect to a substance parameter $a_{k'}$ in which $k' \neq k$, the following numerical expression 16 is obtained.

$$\frac{\partial w_k}{\partial a_{k'}} = -\frac{w_k w_{k'}}{a_{k'}} \quad [\text{Math. 16}]$$

Based on the numerical expression 14, a magnitude $\sigma(w_k)$ of an error of the weight fraction $w_k$ when an error $\sigma(a_k)$ (k represents an integer of from 1 to K) of the substance parameter $a_k$ is propagated to the weight fraction $w_k$ can be estimated by the following numerical expression 17.

$$\sigma(w_k) = w_k\left[(1-w_k)^2 \frac{\sigma^2(a_k)}{a_k^2} + \sum_{k' \neq k}^{K} w_{k'}^2 \frac{\sigma^2(a_{k'})}{a_{k'}^2}\right]^{1/2} \quad [\text{Math. 17}]$$

In the first example, the chemical composition of one crystalline phase is uncertain, and those of the other two crystalline phases are known. That is, the chemical compositions of the other two crystalline phases are apparent. The first example is, in particular, a three-component system (the chemical composition of one of the three components is uncertain). In this case, the two crystalline phases are known, and the substance parameters $a_k$ (k=1, 2) thereof are known. Therefore, the error caused by the known crystalline phases is $\sigma(a_1)=\sigma(a_2)=0$, and the error $\sigma(w_3)$ of the weight fraction $w_3$ of the uncertain crystalline phase can be represented by the following numerical expression through use of the error $\sigma(a_3)$ caused by the uncertain crystalline phase (unconfirmed crystalline phase).

$$\sigma(w_3) = w_3(1-w_3)\frac{\sigma(a_3)}{a_3} \quad [\text{Math. 18}]$$

When $a_3=0.10696$ and $\sigma(a_3)=0.00632$ are substituted into the numerical expression 18 from the average value and the standard deviation of the substance parameters $a_k$ of the seven chemical compositions shown in FIG. 7, $\sigma(w_3)=0.0008=0.08\%$ is obtained with respect to $w_3=1.390$. Further, when $\sigma(a_3)=0.00353=0.10696$ (average value)– 0.10343 (value of $a_k$ of $Fe_2O_3$), which is an error in actual calculation, is used, $\sigma(w_3)=0.00045=0.045\%$ is obtained. Thus, the value is close to an actually calculated result.

From the above-mentioned discussion, when the sample is a multicomponent system of K phases (K represents an integer of 2 or more), only one phase (assumed to be an n-th phase) (1, 2, 3, . . . , n, . . . , K) is an uncertain crystalline phase, and the remaining (K–1) crystalline phases are known, the error $\sigma(w_n)$ of quantification with respect to the uncertain crystalline phase (n-th phase) is represented by the following numerical expression 19 irrespective of which integer of 2 or more the value of K has.

$$\sigma(w_n) = w_n(1-w_n)\frac{\sigma(a_n)}{a_n} \quad [\text{Math. 19}]$$

Further, the ratio of the error $\sigma(w_n)$ with respect to the weight fraction $w_n$ is represented by the following numerical expression 20.

$$\frac{\sigma(w_n)}{w_n} = (1-w_n)\frac{\sigma(a_n)}{a_n} \qquad \text{[Math. 20]}$$

In general, the weight fraction $w_n$ of the uncertain crystalline phase is expressed in a small amount in most cases, and $w_n$ is several %. Therefore, $1-w_n$ can be roughly approximated to 1. Thus, the numerical expression 20 is represented by the following numerical expression 21 through rough approximation.

$$\frac{\sigma(w_n)}{w_n} \approx \frac{\sigma(a_n)}{a_n} \qquad \text{[Math. 21]}$$

In the actual calculation example, $\sigma(a_n)/a_n=0.00353/0.10343=3.4\%$, which is well matched with $\sigma(w_n)/w_n=0.04/1.35=3.0\%$ in the actual calculation example.

FIG. 10 is a table for showing calculated values representing quantification accuracy of uncertain crystalline phases in a multicomponent system. $\sigma(w_n)$ when values of $\sigma(a_n)/a_n$ and $w_n$ are given through use of the numerical expression 19 is shown in FIG. 10. When the range of $\sigma(a_n)/a_n$ of 6% or less and $w_n$ of 3% or less is considered as a realistic sample when the sample contains a small amount of one uncertain crystalline phase, $\sigma(w_n)/w_n$ can be estimated as an error of about 6% at most.

Second Example

The quantitative phase analysis of a solid solution is described as a second example. In this case, the sample is ferrite. Ferrite is a magnetic material obtained by mixing and sintering cobalt, nickel, manganese, and the like with iron oxide as a main component, and is used as an important electronic material. Regarding the synthesis method therefor, a large number of research results have been reported. Ferrite has a spinel-type crystal structure and is represented by a composition formula: $AFe_2O_4$ (A represents Mn, Co, Ni, Cu, Zn, or the like). In the same manner as in the quality management in a manufacturing process, the quantitative phase analysis of each crystalline phase under research and development provides information required for making various determinations in the following steps.

In a certain synthesis experiment, $\alpha$-$Fe_2O_3$ generated by firing $Fe_2O_3$ (magnetite) is mixed with ZnO powder in a molar ratio of 1:1. Further, the mixture is fired at 700° C. for 3 hours to provide a product, and the product is inspected by an X-ray powder diffraction method. As result, the generation of $ZnFe_2O_4$ is recognized, and diffraction lines of unreacted $\alpha$-$Fe_2O_3$ and ZnO are simultaneously observed. Here, Zn-ferrite to be generated is considered as $(Zn_xFe_{1-x})Fe_2O_4$ rather than a perfect chemical composition of $ZnFe_2O_4$, and Zn-ferrite is an uncertain crystalline phase having an uncertain chemical composition. There are residual compounds ($\alpha$-$Fe_2O_3$ and ZnO). Therefore, regarding an unknown number x, chemical analysis is generally almost impossible unless, for example, precise measurement of a lattice constant is performed. Nonetheless, quantitative phase analysis is enabled by determining each weight fraction $w_k$ through use of the numerical expression 13.

FIG. 11 is a table for showing a value of the substance parameter $a_k$ of each related compound in the second example of the present invention. In addition to each substance parameter $a_k$ of ZnO and $\alpha$-$Fe_2O_3$, the value of the substance parameter $a_k$ when the value of x is changed from 0 to 1 in Zn-ferrite $(Zn_xFe_{1-x})Fe_2O_4$ is shown in FIG. 11.

FIG. 12A and FIG. 12B are each a table for showing quantitative phase analysis results in the second example of the present invention. The weight fractions $w_k$ of each phase determined through use of the value of the substance parameter $a_k$ shown in FIG. 11 in the case where x=0, 0.2, 0.4, 0.6 and the case where x=0.8, 1 are shown in FIG. 12A and FIG. 12B, respectively. As shown in FIG. 12A and FIG. 12B, in spite of the fact that the variation in value of the substance parameter $a_k$ is 0.00525, that is, about 5% between x=0 and x=1, a difference between the quantitative results (weight fractions $w_k$) is merely 0.19% at most. The molar ratio of the initial mixed sample is 1:1, and the values of the weight fractions $w_k$ of the residual $\alpha$-$Fe_2O_3$ and ZnO are small. Therefore, the value of x of Zn-ferrite $(Zn_xFe_{1-x})Fe_2O_4$ to be generated is considered to be in the vicinity of 1. The error of the weight fractions $w_k$ of Zn-ferrite at x=0.8 and x=1.0 is 0.03% and falls within a range of an observation error. Thus, quantitative phase analysis can be performed without causing substantial problems even when the value of x has not been identified, by substituting the substance parameter $a_k$ of the solid solution into the numerical expression 13.

The error of the weight fraction $w_k$ in the second example is discussed below. In the same manner as in the first example, the second example is a three-component system. One phase is a solid solution and is an uncertain crystalline phase having an uncertain chemical composition, and those of the remaining two crystalline phases are known. Thus, in the same manner as in the first example, the numerical expression 19 (or the numerical expression 18) can be applied. As shown in FIG. 12B, when it is assumed that $\Delta a_k=0.00525$, which is a difference of the substance parameters $a_k$ between x=0 and x=1, $\sigma(w_n)=0.9619\cdot(1-0.9619)(0.00525/0.09612)=0.0020=0.20\%$ based on the numerical expression 19. This value is well matched with a magnitude of 0.19% of an error in an actual quantitative phase analysis result.

Third Example

Quantitative phase analysis of a two-phase coexistent phase is described as a third example. In this case, the sample is PZT ($PbZr_{1-x}Ti_xO_3$). PZT has a high dielectric constant and excellent piezoelectric and pyroelectric characteristics. Therefore, PZT is one of the most important ferroelectric thin film materials and has a perovskite-type crystal structure. As a method of synthesizing PZT, there has been known a method involving firing a mixture of PZ ($PbZrO_3$) and PT ($PbTiO_3$) to produce PZT. One report has reported the following. In this firing process, a pyrochlore phase (chemical composition: $A_2B_2O_7$) that is a low-temperature stabilized phase of a PZT solid solution is observed at 850° C., and further, a perovskite phase is observed at 1,100° C. As the temperature further increases, the pyrochlore phase disappears, and only the perovskite phase remains at 1,300° C. Pb is liable to volatilize in the firing process, and hence Pb is fired generally by being mixed with excessive PbO.

In this firing process, an $A_2B_2O_7$ type appears in the coexistence of two kinds of $ABO_3$ types (PZ+PT). The initial two kinds of $ABO_3$ types disappear along with the increase in temperature, and simultaneously, a new $AB_{1-x}C_xO_3$ type appears. During this time, the $A_2B_2O_7$ type and $AB_{1-x}C_xO_3$ type exist in a coexistent state. Further, the $A_2B_2O_7$ type that is also considered to be deficient in cations as compared to the $ABO_3$ types exists in the middle, and this $A_2B_2O_7$ type further complicates the situation. It is possible to track existing crystalline phases through identification in such firing reaction process, but quantitative phase analysis has been generally difficult. Nonetheless, quantitative phase analysis of a two-phase coexistent phase can be performed as described below.

FIG. 13 is a table for showing a value of the substance parameter $a_k$ of each related compound in the third example of the present invention. The perovskite type, the pyrochlore type (models deficient in oxygen and models deficient in oxygen and cations), and the value of the substance parameter $a_k$ of a compound in each of the types are shown. The sample in the third example contains two crystalline phases of a perovskite phase (perovskite type) and a pyrochlore phase (pyrochlore type). Those two phases both have an uncertain chemical composition. One of the two phases can be defined as a first crystalline phase and the other can be defined as a second crystalline phase (both the first crystalline phase and the second crystalline phase are uncertain crystalline phases). A synthesis experiment is performed in the vicinity of x=0.5 which is physically excellent, and hence x=0.4, 0.5, 0.6 in each of the perovskite type and the pyrochlore type. When the value of x is, for example, 0.4 in the perovskite type, the value of x increases two-fold to reach 0.8 in the pyrochlore type. When the neutrality of charge in the entire crystal is considered, there is a risk in that a part of Pb may change from divalent to trivalent with respect to seven oxygens in the pyrochlore type. Further, models deficient in oxygen are generally considered, and the risk of deficiency of cations with regard to Pb, which is liable to volatilize, may also be considered in this sample. Then, in the pyrochlore type, the models deficient in oxygen and the models deficient in oxygen and further cations (Pb) are considered together with a change in value of x. In synthesis, excessive 20% PbO is added in consideration of volatilization of Pb. In this case, the models deficient in 10% Pb are considered.

FIG. 14 is a table for showing quantitative phase analysis results in the third example of the present invention. The weight fraction $w_k$ of each phase determined through use of the value of the substance parameter $a_k$ shown in FIG. 13 is shown in FIG. 14. Pb is an extremely heavy atom, and the ratio of Pb has a remarkable effect on the value of the substance parameter $a_k$. Nonetheless, even when the amount of Pb changes by 10%, the effect on the substance parameter $a_k$ is only 2.3%, and the effect of the difference in substance parameter $a_k$ on the weight fraction $w_k$ is only about 0.5%. Here, the effect of the ratio of Zr/Ti is only 0.01% and is sufficiently small. Thus, even when the sample contains two uncertain crystalline phases (first crystalline phase and second crystalline phase), quantitative phase analysis can be performed with satisfactory accuracy by estimating each substance parameter $a_k$.

An error of the weight fraction $w_k$ in the third example is discussed below. In the third example, the chemical composition of the perovskite-type crystalline phase that is a final product is relatively clear, but there is an increased risk of deficiency of oxygen and deficiency of cations in the chemical composition of the pyrochlore-type crystalline phase that is an intermediate product. Therefore, in actual synthesis, the amount of PbO is increased in order to prevent the deficiency of cations. An error $\sigma(w_k)$ of the weight fraction $w_k$ in the third example is estimated through use of the numerical expression 17.

From FIG. 13, the substance parameter $a_k$=0.04081±0.00003 is used for the perovskite type, and the substance parameter $a_k$=0.04219±0.00096 is used for the pyrochlore type. When those values are substituted into the numerical expression 17, the error $\sigma(w_k)$=0.0050=0.50% of the weight fraction $w_k$ is obtained. This value is well matched with a difference in weight fraction $w_k$ of from 0.54% to 0.55% shown in FIG. 14.

Fourth Example

Quantitative phase analysis of mineral resources is described as a fourth example. In this case, the sample is mineral resources. Identification and quantitative phase analysis with respect to mineral species of mineral resources to be mined serve as information for determining which refining step should be adopted, and this determination has an effect on refining cost and the like. Therefore, such quantitative phase analysis is extremely important. Meanwhile, the composition of a natural mineral is complicated. Therefore, it is easy to clarify the chemical composition of a bulk through fluorescent analysis or the like, but in order to clarify the chemical composition of each of mineral species under a state in which a plurality of kinds of mined minerals are mixed, separation and the like of each of the mineral species is required, which is not practically possible in terms of both cost and time.

Here, as an example of quantitative phase analysis of mineral resources, the sample is assumed to be a mined sample that is a sheet silicate mineral. Such mined sample contains paragenesis of muscovite, biotite, and α-quartz that are sheet silicate minerals. The sample contains muscovite and biotite each having an uncertain chemical composition. One of the minerals can be defined as a first crystalline phase, and the other can be defined as a second crystalline phase (both the first and second crystalline phases are uncertain crystalline phases). In a crystal, there is a limitation on the kind and configuration ratio of cations that occupy a tetrahedral site (4-fold coordination site), an octahedral site (6-fold coordination site), and the like. Large cations make the structure more stable when it is difficult to occupy the tetrahedral site. Therefore, there is a tendency that the tetrahedral site is shifted to a larger octahedral site, and such tendency is also found in natural minerals. However, the cations occupying each site include a large number of kinds including minor components. Most of the natural minerals are subjected to chemical analysis for each production area, and the results have been reported, and hence the range of the number of cations that may occupy each site is known.

FIG. 15 is a table for showing a chemical composition, a value of a second factor (chemical formula weight $M_k$), a value of a third factor ($E_k$), and a value of the substance parameter $a_k$ of each of the mineral species in the fourth example of the present invention. When the mineral species are muscovite, biotite, and α-quartz, it may be assumed that the above-mentioned values fall within the range shown in FIG. 15. In the case of a silicate mineral, the kind and number of cations of the remaining octahedral site are defined based on the ratio of Si:Al (portions represented by ($Si_xAl_y$) of the chemical compositions shown in FIG. 15) of the tetrahedral site forming the skeleton of the structure. Muscovite and biotite shown in FIG. 15 each have an extreme composition in which a Si/Al ratio of the tetrahedral site belongs to the maximum or the minimum among natural products, and in FIG. 15, the values of the substance parameter $a_k$ thereof and average values of the substance parameter $a_k$ are respectively shown.

FIG. 16A and FIG. 16B are each a table for showing quantitative phase analysis results in the fourth example of the present invention. Quantification examples 1 to 5 shown in FIG. 16A and FIG. 16B respectively represent a combination of the substance parameter $a_k$ in the case where the Si/Al ratio of muscovite is minimum and the substance parameter $a_k$ in the case where the Si/Al ratio of biotite is maximum, a combination of the substance parameter $a_k$ in the case where the Si/Al ratio of muscovite is maximum and the substance parameter $a_k$ in the case where the Si/Al ratio of biotite is minimum, a combination of the substance parameter $a_k$ in the case where the Si/Al ratio of muscovite is minimum and an average value of the substance parameters $a_k$ of biotite, a combination of the substance parameter $a_k$ in the case where the Si/Al ratio of muscovite is minimum and the substance parameter $a_k$ in the case where the Si/Al ratio of biotite is minimum, and a combination of the substance parameter $a_k$ in the case where the Si/Al ratio of muscovite is maximum and the substance parameter $a_k$ in the case where the Si/Al ratio of biotite is maximum. In FIG. 16A and FIG. 16B, the weight fraction $w_k$ determined through use of the numerical expression 13 based on the substance parameter $a_k$ of the mineral species of each of the above-mentioned five quantification examples is shown, and further, even when the chemical composition of each of the mineral species is not clarified from an average value of the weight fractions $w_k$ of the above-mentioned five quantification examples and a magnitude (0.14% at maximum) of the standard deviation with respect to the average value, quantitative phase analysis of the mineral resources can be performed with high accuracy. Thus, even when the sample contains two uncertain crystalline phases (first crystalline phase and second crystalline phase) in the same manner as in the third example, quantitative phase analysis can be performed with satisfactory accuracy by estimating each substance parameter $a_k$. As shown in FIG. 16A and FIG. 16B, the weight fraction $w_k$ of α-quartz in which the chemical composition does not change is hardly influenced by a change in substance parameter $a_k$ of the other two components.

An error of the weight fraction $w_k$ in the fourth example is discussed below. In the same manner as in the third example, the error $\sigma(w_k)$ of the weight fraction $w_k$ in the fourth example is estimated through use of the numerical expression 17. Here, the error $\sigma(a_k)$ of α-quartz in which the chemical composition does not change is 0. From FIG. 15, the substance parameter $a_k$=0.17973±0.00079 is used for muscovite, and the substance parameter $a_k$=0.15695±0.00086 is used for biotite. When those values are substituted into the numerical expression 17, the error $\sigma(w_k)$=0.0016=0.16% of the weight fraction $w_k$ is obtained with respect to muscovite, and the error $\sigma(w_k)$=0.0012=0.12% of the weight fraction $w_k$ is obtained with respect to biotite. Those values are well matched with the standard deviation of 0.14% shown in FIG. 16B.

From the discussion on the error of the weight fraction $w_k$ in the first to fourth examples, it is apparent that the magnitude $\sigma(w_k)$ of the error of the weight fraction $w_k$ caused by the uncertainty of the substance parameter $a_k$ can be estimated by the numerical expression 17 based on the law of propagation of errors. When the substance parameter $a_k$ of only one phase (assumed to be the n-th phase) is uncertain in the sample of a multicomponent system, $\sigma(w_k)$ can be estimated by the numerical expression 19. Further, when each phase has a similar chemical composition in the sample of the multicomponent system, the substance parameter $a_k$ (k represents an integer of from 1 to K) of each phase can be assumed to be a representative value $a_k^{av}$, and $\sigma(a_k)$ (k represents an integer of from 1 to K) can be similarly assumed to be a representative value $\sigma(a_k^{av})$. In this case, the magnitude $\sigma(w_k)$ of the error of the weight fraction $w_k$ represented by the numerical expression 17 is rewritten by the following numerical expression 22.

$$\sigma(w_k) = w_k \frac{\sigma(a_k^{av})}{a_k^{av}} \left[ (1-w_k)^2 + \sum_{k' \neq k}^{K} w_{k'}^2 \right]^{1/2} \quad \text{[Math. 22]}$$

Fifth Example

Quantitative phase analysis of a mixture of cement and iron and steel slag is described as a fifth example. Even when the cement can be easily identified in such mixture, the iron and steel slag may be formed of a plurality of components to serve as a plurality of uncertain crystalline phases. Here, the uncertain crystalline phase having an uncertain chemical composition includes the case where ambiguity remains although the crystalline phase seems to have been identified, as well as the case where the crystalline phase cannot be identified. The fifth example shows the case where the sample contains a plurality of uncertain crystalline phases (a plurality of unidentified crystalline phases) each having an uncertain chemical composition, and the chemical composition of the entire plurality of uncertain crystalline phases is determined, and provides a method involving analyzing the plurality of uncertain crystalline phases collectively in one group and determining a value of a substance parameter with respect to the one group to be required in this analysis.

The sample is a multicomponent system of K phases (K represents an integer of 3 or more) and contains a plurality of uncertain crystalline phases. A group of identified crystalline phases is defined as a group G1, and a group of uncertain crystalline phases is defined as a group G2. In this case, the number of crystalline phases belonging to the group G1 is represented by $K_{G1}$ ($K_{G1}$ represents an integer of 1 or more), and the number of crystalline phases belonging to the group G2 is represented by $K_{G2}$ ($K_{G2}$ represents an integer of 2 or more) ($K_{G1}+K_{G2}=K$). In the fifth example, the crystalline phases belonging to the group G1 are individually dealt with, and the plurality of crystalline phases belonging to the group G2 are collectively dealt with. When the weight fraction of the entire group G2 is represented by $w_{G2}$, the weight fraction $w_{G2}$ is given by the numerical expression 23 based on the numerical expression 13.

$$w_{G2} = \sum_{k'=K_{G1}+1}^{K} w_{k'} = \sum_{k'=K_{G1}+1}^{K} a_{k'} S_{k'} \left( \sum_{k'=1}^{K_{G1}} a_{k'} S_{k'} + \sum_{k'=K_{G1}+1}^{K} a_{k'} S_{k'} \right)^{-1} \quad \text{[Math. 23]}$$

The plurality of crystalline phases belonging to the group G2 are uncertain crystalline phases, and hence the first factor $S_k$ ($=\Sigma I^{obs}_{j,k}/Lp_{jk}$) of each crystalline phase cannot be determined. However, a sum of the first factors $S_k$ with respect to all the crystalline phases belonging to the group G2 can be determined. Therefore, the weight factor $W_{G2}$ of the entire plurality of crystalline phases belonging to the group G2 is defined by the following numerical expression 24.

$$W_{G2} = \sum_{k'=K_{G1}+1}^{K} a_{k'} S_{k'} = a_{G2} \sum_{k'=K_{G1}+1}^{K} S_{k'} \quad [\text{Math. 24}]$$

Here, $a_{G2}$ represents a substance parameter with respect to the entire group G2. The substance parameter $a_{G2}$ is represented by the following numerical expression 25 based on the numerical expression 24 through use of $a_k S_k = W_{k'}$ (numerical expression 12) and the numerical expression 13.

$$a_{G2} = \quad [\text{Math. 25}]$$

$$\sum_{k'=K_{G1}+1}^{K} a_{k'} S_{k'} \bigg/ \sum_{k'=K_{G1}+1}^{K} S_{k'} = \sum_{k'=K_{G1}+1}^{K} w_{k'} \bigg/ \sum_{k'=K_{G1}+1}^{K} \frac{w_{k'}}{a_{k'}}$$

The middle part of the numerical expression 25 shows that the substance parameter $a_{G2}$ is determined by subjecting the substance parameter $a_{k'}$ of each of the plurality of uncertain crystalline phases belonging to the group G2 to weighted average by the first factor $S_{k'}$. Then, the right part of the numerical expression 25 shows that the substance parameter $a_{G2}$ is calculated even with the weight fraction $w_{k'}$. The numerical expression 23 is rewritten by the following numerical expression 26 by substituting the numerical expression 24 into the numerical expression 23, and the weight fraction $w_{G2}$ can be determined through use of the numerical expression 26.

$$w_{G2} = a_{G2} \sum_{k'=K_{G1}+1}^{K} S_{k'} \left( \sum_{k'=1}^{K_{G1}} a_{k'} S_{k'} + a_{G2} \sum_{k'=K_{G1}+1}^{K} S_{k'} \right)^{-1} \quad [\text{Math. 26}]$$

Further, the weight fraction $w_k$ (k represents an integer of from 1 to $K_{G1}$) of the crystalline phase belonging to the group G1 can be determined by the following numerical expression 27 based on the numerical expressions 13 and 24.

$$w_k = a_k S_k \left( \sum_{k'=1}^{K_{G1}} a_{k'} S_{k'} + a_{G2} \sum_{k'=K_{G1}+1}^{K} S_{k'} \right)^{-1} \quad [\text{Math. 27}]$$

However, neither the first factor $S_{k'}$ of the uncertain crystalline phase belonging to the group G2 nor the weight fraction $w_{k'}$ thereof (k' represents an integer of from ($K_{G1}+1$) to K) has been determined, and hence with this, the substance parameter $a_{G2}$ cannot be determined. However, when a chemical analysis value of the entire group G2 is determined, and a chemical formula corresponding to the entire group G2 is derived (determined) based on the chemical analysis value, the substance parameter $a_{G2}$ can be determined.

FIG. 17 is a table for showing a chemical composition, a value of the chemical formula weight $M_k$, a value of the substance parameter $a_k$, and a value of the weight fraction $w_k$ of each of the crystalline phases belonging to the group G2 in the fifth example of the present invention. Here, the case where there are five uncertain crystalline phases belonging to the group G2 is assumed, but the present invention is not limited thereto. Minerals and the weight fractions $w_k$ thereof may be suitably selected. Further, the weight fraction $w_{G1}$ of the entire crystalline phases belonging to the group G1 and the weight fraction $w_{G2}$ of the entire crystalline phases belonging to the group G2 are assumed to be $w_{G1}=w_{G1}-w_{G2}-0.5$.

A chemical formula of the entire crystalline phases belonging to the group G2 can be calculated through use of each value shown in FIG. 13. A molecular formula (chemical formula) of any atom or any component may be used as a reference, but in this case, a factor f is defined by the following numerical expression 28 with corundum ($Al_2O_3$) being a reference.

$$f = \frac{w_k}{w_{corundum}} \cdot \frac{M_k}{M_{corundum}} \quad [\text{Math. 28}]$$

The relative number (relative number of pieces) of the entire atoms contained in the entire crystalline phases belonging to the group G2 can be calculated by multiplying the number of each atom of each crystalline phase belonging to the group G2 by the factor f.

FIG. 18 is a table for showing a value of the factor f of each of the crystalline phases belonging to the group G2 in the fifth example of the present invention and a value of the relative number (relative number of pieces) of each atom contained in the crystalline phases. Ca=4.73565, Si=5.76172, Al=2, Fe=3.30272, Mg=1.26468, and O=24.92739 are obtained by correcting the relative number of each atom shown in FIG. 18, respectively. A chemical formula of the entire crystalline phases belonging to the group G2 is determined to be $Ca_{4.74}Si_{5.76}Al_2Fe_{3.30}Mg_{1.26}O_{24.93}$. A chemical formula weight (molecular weight) $M_{G2}$ of this chemical formula is $M_{G2}=1019.60871$, and the substance parameter $a_{G2}$ is $a_{G2}=0.138315$. The value of the substance parameter $a_{G2}$ determined by the chemical formula of the entire crystalline phases belonging to the group G2 described above is completely matched with the value of the substance parameter $a_{G2}$ determined by the numerical expression 25 through use of the values of the substance parameter $a_k$ and the weight fraction $w_k$ of each crystalline phase shown in FIG. 17. Thus, it is shown that, when the chemical formula of the entire crystalline phases belonging to the group G2 can be experimentally determined, the value of the substance parameter $a_{G2}$ is determined.

In the fifth example in which the sample is a mixture of cement and iron and steel slag, the components of the cement are relatively easily identified. Meanwhile, the iron and steel slag may contain a large number of kinds of minerals, and hence those crystalline phases are not easily identified. Diffraction lines of main minerals contained in the cement are identified, and the identified crystalline phases are classified into the group G1. The diffraction line corresponding to each identified crystal line phase is individually dealt with as described above. Meanwhile, the iron and steel slag contains a plurality of uncertain crystalline phases, and diffraction lines considered to be derived from the iron and steel slag are classified to correspond to the plurality of crystalline phases belonging to the group G2. Each of the plurality of uncertain crystalline phases belonging to the group G2 is unidentified, and hence those diffraction lines cannot be decomposed (distinguished) into each crystalline phase. However, as described above, it is technically sufficiently possible to determine a sum of the first factors $S_k$ with respect to those diffraction lines corresponding to the plurality of uncertain crystalline phases belonging to the group G2.

Further, the iron and steel slag has a feature in chemical composition depending on the origin of the sample, and a large number of chemical analysis values with respect to the entire iron and steel slag have been reported. A chemical formula of the entire iron and steel slag (plurality of crystalline phases belonging to the group G2) is derived based on the chemical analysis values, and the substance parameter $a_{G2}$ can be determined with respect to the chemical formula. Thus, weight fractions of each of the main minerals of the cement and the iron and steel slag (assembly of the plurality of uncertain crystalline phases) can be determined through use of the numerical expressions 26 and 27.

Sixth Example

Quantitative phase analysis of one uncertain crystalline phase (single phase) in a multicomponent system is described as a sixth example. For example, the first example shows the method of determining the substance parameter $a_k$ of one uncertain crystalline phase when the sample contains the one uncertain crystalline phase. The sixth example shows a method of estimating a substance parameter of a crystalline phase having an uncertain chemical composition (uncertain crystalline phase) when the sample contains the uncertain crystalline phase and the chemical composition of the entire sample is determined.

The fifth example shows a method involving collectively dealing with the plurality of uncertain crystalline phases belonging to the group G2 and presuming a chemical formula (chemical composition) of the entire plurality of crystalline phases belonging to the group G2 through use of the numerical expression 25. This procedure is applied to the entire sample in the sixth example. Here, the substance parameter of the entire sample is represented by $a_G$. The number of crystalline phases contained in the sample is represented by K (K represents an integer of 2 or more), and the substance parameter $a_G$ is represented by the following numerical expression 29 with reference to the numerical expression 25.

$$a_G = \sum_{k'=1}^{K} w_{k'} \bigg/ \sum_{k'=1}^{K} \frac{w_{k'}}{a_{k'}} = 1 \bigg/ \sum_{k'=1}^{K} \frac{w_{k'}}{a_{k'}} \qquad [\text{Math. 29}]$$

In this case, the fact that the sum of the weight fractions $w_{k'}$ of the plurality of crystalline phases satisfies a normalization condition $\Sigma w_{k'}=1$ (sum for k' ranging from 1 to K) is used. Of the K crystalline phases contained in the sample, a K-th crystalline phase is assumed to be an uncertain crystalline phase, the substance parameter $a_K$ of the uncertain crystalline phase is represented by $a_{UK}$, and the weight fraction $w_K$ is represented by $w_{UK}$. The substance parameter $a_{UK}$ is represented by the following numerical expression 30 through use of the numerical expression 29.

$$a_{UK} = w_{UK} \left( \frac{1}{a_G} - \sum_{k'=1}^{K-1} \frac{w_{k'}}{a_{k'}} \right)^{-1} \qquad [\text{Math. 30}]$$

Figure 19:
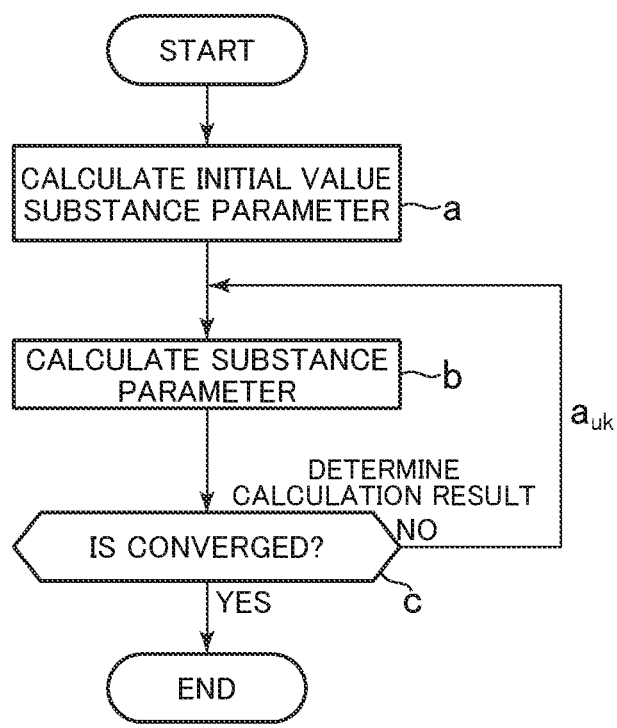
FIG. 19 is a flowchart for illustrating an example of a weight ratio calculation step S4 in a sixth example of the present invention.

It is generally known what was mixed as a starting material in a batch chemical formula (chemical composition) at the time of synthesis. When it is assumed that there is no volatilization or mixing during synthesis, the substance parameter $a_G$ can be determined based on the chemical composition. Further, as necessary, a chemical formula of the entire sample can be determined, for example, by performing fluorescent X-ray analysis. In the numerical expression 30, the weight fraction $w_{UK}$ is unknown. Therefore, the substance parameter $a_{UK}$ is calculated by a calculation method for the substance parameter $a_{UK}$ described below. FIG. 19 is a flowchart for illustrating an example of the weight ratio calculation step S4 in the sixth example of the present invention, and a calculation method for the substance parameter $a_{UK}$ is shown in FIG. 19. The weight ratio calculation unit 24 of the analysis unit 2 includes an initial value substance parameter calculation unit 25a, a substance parameter calculation unit 25b, and a calculation result determination unit 25c. Those units are means for executing each step of the weight ratio calculation step S4 described below.

[Step a: Initial Value Substance Parameter Calculation Step (p=1)]

A weight fraction of each of a plurality of crystalline phases is calculated through use of an initial value of a substance parameter of an uncertain crystalline phase, and a substance parameter of the uncertain crystalline phase is calculated through use of a substance parameter of the entire sample, substance parameters of the crystalline phases other than the uncertain crystalline phase in the plurality of crystalline phases, and the calculated weight fraction of each of the plurality of crystalline phases (a: initial value substance parameter calculation step). Here, an initial value of the substance parameter $a_{UK}$ is set to $a_{UK}=a_G$, and the weight fraction $w_k$ of each of the crystalline phases is determined through use of the numerical expression 13. Next, the substance parameter $a_{UK}$ is determined through use of the numerical expression 30. This step is referred to as first cycle (p=1). Here, as the initial value of the substance parameter $a_{UK}$, the substance parameter $a_G$ is used. It is desired that the substance parameter $a_G$ is defined as the initial value. However, the present invention is not limited thereto, and another value may be defined as the initial value.

[Step b: Substance Parameter Calculation Step (p≥2)]

A weight fraction of each of the plurality of crystalline phases is calculated through use of the already calculated substance parameter of the uncertain crystalline phase, and a substance parameter of the uncertain crystalline phase is calculated through use of the substance parameter of the entire sample, the substance parameters of the crystalline phases other than the uncertain crystalline phase in the plurality of crystalline phases, and the calculated weight fraction of each of the plurality of crystalline phases (b: substance parameter calculation step). The weight fraction $w_k$ of each of the crystalline phases is determined by the numerical expression 13 through use of the calculated substance parameter $a_{UK}$. Next, the substance parameter $a_{UK}$ is determined through use of the numerical expression 30. In the first round calculation of the numerical expression 13, the substance parameter $a_{UK}$ determined in the step a (first cycle) is used (second cycle: p=2). In the q-th (q=p−1≥2) round calculation of the numerical expression 13, the substance parameter $a_{UK}$ determined in the (q−1)-th round step b is used ((q+1)-th cycle: p=q+1).

[Step c: Calculation Result Determination Step]

It is determined whether or not the substance parameter of the uncertain crystalline phase calculated in the substance parameter calculation step satisfies a predetermined condition (c: calculation result determination step). It is determined whether or not the substance parameter $a_{UK}$ determined in the step b has been sufficiently converged. When the substance parameter $a_{UK}$ has been sufficiently converged, the step is finished. When the substance parameter $a_{UK}$ has not been sufficiently converged, the step b is performed again. It is only necessary that a user appropriately determine a condition for determining whether or not the substance parameter $a_{UK}$ has been sufficiently converged. For example, when a difference between the substance parameter $a_{UK}$ determined in the step a and the substance parameter $a_{UK}$ determined in the first round step b (difference between the first cycle and the second cycle) is equal to or less than a predetermined value in the first round, it is determined that the substance parameter $a_{UK}$ has been sufficiently converged. When a difference between the substance parameter $a_{UK}$ determined in the (q−1)-th round step b and the substance parameter $a_{UK}$ determined in the q-th round step b (difference between the q-th cycle and the (q+1)-th cycle) is equal to or less than a predetermined value in the q-th round (q=p−1≥2), it is determined that the substance parameter $a_{UK}$ has been sufficiently converged.

FIG. 20A and FIG. 20B are each a table for showing calculation results of the calculation method for the substance parameter $a_{UK}$ in the sixth example of the present invention. As the mixed sample in the sixth example, the same material as the iron and steel slag (five crystalline phases belonging to the group G2) in the fifth example is assumed. In the fifth example, the weight fraction $w_{G2}$ of the entire plurality of crystalline phases belonging to the group G2 is 0.5, but in the sixth example, the mixed material forms the entire sample. Thus, the weight fraction $w_k$ of each crystalline phase shown in FIG. 20A is twice the weight fraction $w_k$ of each crystalline phase shown in FIG. 17. In the five crystalline phases shown in FIG. 20A, the first to fourth crystalline phases are assumed to be known crystalline phases, and the fifth crystalline phase (Periclase: MgO) is assumed to be an uncertain crystalline phase.

Here, a chemical analysis value of the entire sample is obtained, and a chemical formula of the entire sample is derived. Then, the substance parameter $a_G$ is determined with respect to the chemical formula. The determined substance parameter $a_G$ is 0.138315. In the first cycle (step a), the substance parameter $a_{UK}$ of the fifth crystalline phase that is an uncertain crystalline phase is set to $a_{UK}=a_G=0.138315$, and the weight fraction $w_k$ of each of the crystalline phases is determined. In the "first" (sixth column) of FIG. 20A, a value of the substance parameter $a_{UK}$, and the weight fraction $w_k$ of each of the crystalline phases calculated based on the value of the substance parameter $a_{UK}$ are shown, respectively. In the "second" (seventh column) of FIG. 20A, a value of the substance parameter $a_{UK}$ determined in the first cycle and the weight fraction $w_k$ of each of the crystalline phases calculated based on the value of the substance parameter $a_{UK}$ are shown, respectively. The same also applies to the third and subsequent cycles. As shown in FIG. 20B, a value of the substance parameter $a_{UK}$ shown in the eleventh cycle is sufficiently close to the value of the substance parameter $a_k$ of Periclase.

The method of estimating a substance parameter of a crystalline phase having an uncertain chemical composition (uncertain crystalline phase) by repeated calculation when the sample contains the uncertain crystalline phase and the chemical composition of the entire sample is determined is described above. The method of estimating a substance parameter of an uncertain crystalline phase is not limited thereto, and a method of directly estimating a substance parameter of an uncertain crystalline phase without using repeated calculation is described below. The sample contains at least one crystalline phase (known crystalline phase) to be identified and one uncertain crystal line phase having an uncertain chemical composition, and the chemical composition of the entire sample is determined. In the fifth example, when the numerical expression 24 representing the weight factor $W_{G2}$ of the entire plurality of crystalline phases belonging to the group G2 is applied to the entire sample in the sixth example, the weight factor of the entire sample (that is, W=1) is represented by the following numerical expression 31.

$$\sum_{k'=1}^{K} a_{k'} S_{k'} = a_G \sum_{k'=1}^{K} S_{k'} \qquad [\text{Math. 31}]$$

Here, $a_G$ represents a substance parameter of the entire sample as described above. When the K-th crystalline phase of the K crystalline phases is assumed to be an uncertain crystalline phase, the numerical expression 31 is rewritten by the following numerical expression 32 with the substance parameter $a_{UK}$ and the first factor $S_{UK}$ of the uncertain crystalline phase.

$$a_{UK} S_{UK} + \sum_{k'=1}^{K-1} a_{k'} S_{k'} = a_G \sum_{k'=1}^{K} S_{k'} \qquad [\text{Math. 32}]$$

The substance parameter $a_{UK}$ can be expressed by the following numerical expression 33 based on the numerical expression 32.

$$a_{UK} = \frac{1}{S_{UK}} \left( a_G \sum_{k'=1}^{K} S_{k'} - \sum_{k'=1}^{K-1} a_{k'} S_{k'} \right) \qquad [\text{Math. 33}]$$

The chemical composition of the entire sample is determined, and hence the substance parameter $a_G$ is determined based on the chemical composition. Further, only the K-th crystalline phase is an uncertain crystalline phase in the K crystalline phases. Therefore, the first factor $S_K$ (=$S_{UK}$) of the K-th crystalline phase is determined based on a diffraction line other than diffraction lines identified as belonging to the identified first to (K−1)-th crystalline phases in the diffraction lines to be observed. Thus, the substance parameter $a_{UK}$ of the uncertain crystalline phase is directly determined by the numerical expression 33.

In the same manner as in the sample of the above-mentioned example in which the substance parameter $a_{UK}$ is determined by repeated calculation, here, in the sample, the first to fourth crystalline phases in the five crystalline phases shown in FIG. 20A are assumed to be known crystalline phases, and the fifth crystalline phase (Periclase: MgO) is assumed to be an unknown crystalline phase. The substance parameter $a_{UK}$ of the unknown crystalline phase is determined by the numerical expression 33 through use of the substance parameter $a_k$ and the first factor $S_k$ shown in FIG. 20A. As a result, the substance parameter $a_{UK}$ is $a_{UK}$={0.138315×(559.3458+207.4771+100+ 474.4313+49.6324)−(0.137 575×559.3458+ 0.185447×207.4771+0.192380×100+0.101374× 474.4313)}/49.6324=0.193814.

Specifically, in this method of directly estimating a substance parameter of an uncertain crystalline phase, the repeated calculation illustrated in FIG. 19 is not necessary, and a substance parameter of an uncertain crystalline phase can be calculated only with one substance parameter calculation step (step b). That is, weight ratio calculation means includes substance parameter calculation means for calculating a substance parameter of an uncertain crystalline phase through use of a substance parameter of the entire sample, first factors of at least one crystalline phase to be identified and the uncertain crystalline phase, and a substance parameter of the at least one crystalline phase to be identified.

The sixth example shows the case where the sample contains one crystalline phase having an uncertain chemical composition (uncertain crystalline phase). Even when the sample contains a plurality of uncertain crystalline phases, it is only necessary that the plurality of uncertain crystalline phases be classified into one group, and the substance parameter $a_{UK}$ and the weight fraction $w_{UK}$ be calculated with respect to the entire plurality of uncertain crystalline phases in the same manner as in the sixth example.

In the method of estimating a substance parameter of a plurality of uncertain crystal line phases by repeated calculation, when the sample contains one or more crystalline phases to be identified and a plurality of uncertain crystalline phases each having an uncertain chemical composition, and the chemical composition of the entire sample is determined, the weight ratio calculation means includes substance parameter calculation means for calculating a weight fraction of each of the one or more crystalline phases to be identified and a weight fraction of the entire plurality of uncertain crystalline phases through use of the calculated substance parameter of the entire plurality of uncertain crystalline phases, and calculating a substance parameter of the entire plurality of uncertain crystalline phases through use of a substance parameter of the entire sample, a substance parameter of each of the one or more crystalline phases to be identified, the calculated weight fraction of each of the one or more crystalline phases to be identified, and the calculated weight fraction of the entire plurality of uncertain crystalline phases.

In the method of directly estimating a substance parameter of a plurality of uncertain crystalline phases, when the sample contains one or more crystalline phases to be identified and a plurality of uncertain crystalline phases each having an uncertain chemical composition, and the chemical composition of the entire sample is determined, the weight ratio calculation means includes substance parameter calculation means for calculating a substance parameter of the entire plurality of uncertain crystalline phases through use of a substance parameter of the entire sample, a first factor of at least one crystalline phase to be identified, a first factor of the entire plurality of uncertain crystalline phases, and a substance parameter of the at least one crystalline phase to be identified.

Seventh Example

The case where the sample contains an uncertain crystalline phase is described above. The seventh example shows the case where a plurality of crystalline phases contained in the sample have been identified. Quantitative phase analysis of the sample containing a plurality of crystalline phases having polymorphism of the same chemical composition (chemical formula) is described as a seventh example. When the sample contains a plurality of crystalline phases having polymorphism of the same chemical composition, the substance parameters $a_k$ become equal values. Therefore, when the weight fraction $w_k$ is calculated through use of the numerical expression 13, the weight fraction $w_k$ can be more simply calculated by setting the substance parameter $a_k$ of each crystalline phase to a common substitute value (for example, $a_k=1$). In such case, the weight factor $W_k$ may be set to $W_k=S_k$ based on the numerical expression 12, and it is only necessary that a weight ratio of the plurality of crystalline phases be calculated based on the weight factor $W_k$ with the first factor $S_k$ being the weight factor $W_k$. Further, in such case, the numerical expression 13 is rewritten by the following numerical expression 34.

$$w_k = S_k \bigg/ \sum_{k'=1}^{K} S_{k'} \qquad [\text{Math. 34}]$$

It is only necessary that the weight fraction $w_k$ of one crystalline phase be calculated by calculating a ratio of the first factor $S_k$ (weight factor) of the one crystalline phase with respect to the sum of the first factors $S_k$ (weight factors) of the plurality of crystalline phases based on the numerical expression 34.

Qualitative phase analysis result acquisition means is for acquiring information on the plurality of crystalline phases. The weight ratio calculation means uses first factors of the plurality of crystalline phases acquired by the qualitative phase analysis result acquisition means as weight factors and calculates a weight ratio of the plurality of crystalline phases based on the weight factors.

The quantitative phase analysis device, the quantitative phase analysis method, and the quantitative phase analysis program according to the embodiment of the present invention are described above. The present invention is not limited to the above-mentioned embodiment and can be widely applied. For example, the powder diffraction pattern in the above-mentioned embodiment is obtained by X-ray diffraction measurement. However, the powder diffraction pattern is not limited thereto and may be obtained by another measurement, for example, neutron diffraction measurement. Further, various approximations, such as the determination of diffraction lines included in the powder diffraction pattern and the distribution of intensities of diffraction lines that are superimposed on each other or close to each other, are considered, as necessary. In the quantitative phase analysis method in the above-mentioned embodiment, the weight ratio of the plurality of crystalline phases is calculated, but another quantitative ratio, for example, a molar ratio may be calculated based on such weight ratio.

[Related Technology]

Even when the sample contains a crystalline phase having an uncertain chemical composition, a substance parameter of the crystalline phase can be estimated. As described in the embodiment of the present invention, for example, in X-ray diffraction quantitative phase analysis, the calculation of the weight factor $W_k$ of the crystalline phase requires the second factor $M_k$ and the third factor $E_k$ that are physical quantities specific to the crystalline phase (substance) to be identified by qualitative phase analysis, in addition to the first factor that is a physical quantity obtained by X-ray diffraction measurement, as represented by the numerical expression 3. However, actually, as described above as the first to sixth examples, when the chemical composition of one or more crystalline phases of a plurality of crystalline phases to be targeted is uncertain, it is generally difficult to specify the second factor $M_k$ and the third factor $E_k$. When the sample contains a crystalline phase having an uncertain chemical composition because the second factor $M_k$ and the third factor $E_k$ cannot be estimated, it has hitherto been difficult to perform analysis with high accuracy. However, the inventors of the present invention have found the following. Even when the sample contains a single crystalline phase or a plurality of crystalline phases each having an uncertain chemical composition (uncertain crystalline phases), a variation of a plurality of substance parameters calculated based on each of a plurality of chemical compositions assumed with respect to such crystalline phases is small. Therefore, when the uncertain crystalline phase can be assumed to have any of the plurality of chemical compositions, a substitute value is selected from the plurality of substance parameters calculated based on each of the plurality of chemical compositions, and the substitute value can be estimated as the substance parameter of the uncertain crystalline phase. Even when there are N (N represents an integer of 2 or more) crystalline phases each having an uncertain chemical composition, it is only necessary that a substance parameter of each of such crystalline phases (first to N-th crystalline phases) be estimated. Here, it is desired that the substitute value be a value between a minimum value and a maximum value of the plurality of substance parameters. The substitute value may be an intermediate value between the minimum value and the maximum value. It is more desired that the substitute value be an average value of a plurality of substance parameters to be calculated. When a substance parameter of an uncertain crystalline phase can be estimated as in the embodiment of the present invention, X-ray diffraction quantitative phase analysis with high accuracy is enabled, and information that is useful also for another analysis can be provided.

What is claimed is:

1. A quantitative phase analysis device, which is configured to perform quantitative phase analysis of crystalline phases contained in a sample based on a powder x-ray diffraction pattern of the sample, the quantitative phase analysis device comprising at least one microprocessor configured to:
   acquire information on a plurality of crystalline phases contained in the sample;
   calculate a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the acquired information on the plurality of crystalline phases; and
   output and display the weight ratio as an analysis result.

2. The quantitative phase analysis device according to claim 1,
   wherein, when the powder x-ray diffraction pattern of the sample includes a superimposed x-ray diffraction line in which x-ray diffraction lines of two or more crystalline phases exist and which is free from being decomposed by analysis, the calculating the weight ratio of the plurality of crystalline phases comprises equally distributing a diffracted intensity of the superimposed x-ray diffraction line into the two or more corresponding crystalline phases and calculating the weight ratio of the plurality of crystalline phases through use of the diffracted intensity to be distributed as the diffracted intensities of the x-ray diffraction lines of the two or more corresponding crystalline phases.

3. The quantitative phase analysis device according to claim 1,
   wherein calculating the weight ratio of the plurality of crystalline phases is based on a weight factor obtained by dividing a product of the sum of the diffracted intensities corrected with respect to the Lorentz-polarization factor and the chemical formula weight by the sum of the squares of the numbers of the electrons belonging to each of the atoms contained in the chemical formula unit.

4. The quantitative phase analysis device according to claim 3,
   wherein, when a substance parameter is obtained by dividing the chemical formula weight by the sum of the squares of the numbers of the electrons belonging to each of the atoms contained in the chemical formula unit, and when the sample contains one or more crystalline phases to be identified and one uncertain crystalline phase having an uncertain chemical composition, and a chemical composition of the entire sample is determined, the calculating the weight ratio of the plurality of crystalline phases comprises calculating a substance parameter of the uncertain crystalline phase through use of a substance parameter of the entire sample, the sum of the diffracted intensities corrected with respect to the Lorentz-polarization factor of each of the one or more crystalline phases to be identified and the uncertain crystalline phase, and a substance parameter of each of the one or more crystalline phases to be identified.

5. The quantitative phase analysis device according to claim 3,
   wherein, when a substance parameter is obtained by dividing the chemical formula weight by the sum of the squares of the numbers of the electrons belonging to each of the atoms contained in the chemical formula unit, and when the sample contains one or more crystalline phases to be identified and a plurality of uncertain crystalline phases each having an uncertain chemical composition, and a chemical composition of the entire sample is determined, the calculating the weight ratio of the plurality of crystalline phases comprises calculating a substance parameter of the entire plurality of uncertain crystalline phases through use of a substance parameter of the entire sample, the sum of the diffracted intensities corrected with respect to the Lorentz-polarization factor of each of the one or more crystalline phases to be identified, the sum of the diffracted intensities corrected with respect to the Lorentz-polarization factor of the entire plurality of uncertain crystalline phases, and a substance parameter of each of the one or more crystalline phases to be identified.

6. The quantitative phase analysis device according to claim 3,
   wherein the calculating the weight ratio of the plurality of crystalline phases comprises calculating a weight fraction of one of the plurality of crystalline phases with respect to the entire sample, and
   wherein the calculating the weight ratio of the one of the plurality of crystalline phases with respect to the entire sample comprises calculating the weight fraction by calculating a ratio of a weight factor of the one of the plurality of crystalline phases with respect to a sum of weight factors of the plurality of crystalline phases.

7. The quantitative phase analysis device according to claim 6, wherein, when the powder x-ray diffraction pattern of the sample includes a superimposed x-ray diffraction line in which x-ray diffraction lines of two or more crystalline phases exist and which is free from being decomposed by analysis, the calculating the weight fraction of one of the plurality of crystalline phases with respect to the entire sample comprises:
distributing a diffracted intensity of the superimposed x-ray diffraction line into the two or more corresponding crystalline phases based on the weight fraction of each of the plurality of crystalline phases, which has been calculated; and
calculating the weight fraction of each of the plurality of crystalline phases through use of the diffracted intensity to be distributed.

8. The quantitative phase analysis device according to claim 7,
wherein the acquired information on the plurality of crystalline phases includes a density, and
wherein the distributing the diffracted intensity of the superimposed x-ray diffraction line into the two or more corresponding crystalline phases is performed in proportion to a volume fraction determined based on the weight fraction and the density of each of the plurality of crystalline phases.

9. The quantitative phase analysis device according to claim 7,
wherein, when the calculating the weight fraction of each of the plurality of crystalline phases initially calculates the weight fraction of each of the plurality of crystalline phases, the calculating the weight fraction of each of the plurality of crystalline phases comprises:
equally distributing the diffracted intensity of the superimposed x-ray diffraction line into the two or more corresponding crystalline phases; and
calculating the weight fraction of each of the plurality of crystalline phases through use of the diffracted intensity to be distributed as the diffracted intensities of the x-ray diffraction lines of the two or more corresponding crystalline phases.

10. The quantitative phase analysis device according to claim 7, wherein the distributing the diffracted intensity of the superimposed x-ray diffraction line and the calculating the weight fraction of each of the plurality of crystalline phases are repeatedly driven.

11. The quantitative phase analysis device according to claim 6, wherein, when the sample contains an unknown crystalline phase that is free from being identified by quantitative analysis, the calculating the weight ratio of the one of the plurality of crystalline phases with respect to the entire sample comprises calculating a weight factor of the unknown crystalline phase based on a chemical composition of each of the identified plurality of crystalline phases.

12. The quantitative phase analysis device according to claim 6,
wherein, when a substance parameter is obtained by dividing the chemical formula weight by the sum of the squares of the numbers of the electrons belonging to each of the atoms contained in the chemical formula unit, and when the sample contains an uncertain crystalline phase having an uncertain chemical composition, through use of a value between a minimum value and a maximum value of a plurality of substance parameters respectively calculated based on a plurality of chemical compositions assumed with respect to the uncertain crystalline phase as a substance parameter of the uncertain crystalline phase, the calculating the weight ratio of the one of the plurality of crystalline phases with respect to the entire sample comprises calculating a weight factor of the uncertain crystalline phase based on a product of the substance parameter and the sum of the diffracted intensities corrected with respect to the Lorentz-polarization factor, caused by the uncertain crystalline phase.

13. The quantitative phase analysis device according to claim 12,
wherein the calculating the weight ratio of the one of the plurality of crystalline phases with respect to the entire sample comprises using an average value of the plurality of substance parameters respectively calculated based on the plurality of chemical compositions assumed with respect to the uncertain crystalline phase as the substance parameter of the uncertain crystalline phase.

14. The quantitative phase analysis device according to claim 6,
wherein, when a substance parameter is obtained by dividing the chemical formula weight by the sum of the squares of the numbers of the electrons belonging to each of the atoms contained in the chemical formula unit, and when the sample contains a plurality of uncertain crystalline phases each having an uncertain chemical composition, and a chemical composition of the entire plurality of uncertain crystalline phases is determined, the calculating the weight ratio of the one of the plurality of crystalline phases with respect to the entire sample comprises calculating a weight factor of the entire plurality of uncertain crystalline phases based on a product of a substance parameter of the entire plurality of uncertain crystalline phases and the sum of the diffracted intensities corrected with respect to the Lorentz-polarization factor, caused by the plurality of uncertain crystalline phases.

15. The quantitative phase analysis device according to claim 6,
wherein, when a substance parameter is obtained by dividing the chemical formula weight by the sum of the squares of the numbers of the electrons belonging to each of the atoms contained in the chemical formula unit, and when the sample contains one uncertain crystalline phase having an uncertain chemical composition, and a chemical composition of the entire sample is determined, the calculating the weight ratio of the plurality of crystalline phases comprises calculating a weight fraction of each of the plurality of crystalline phases through use of a substance parameter of the uncertain crystalline phase, which has been calculated, and calculating the substance parameter of the uncertain crystalline phase through use of a substance parameter of the entire sample, a substance parameter of a crystalline phase other than the uncertain crystalline phase in the plurality of crystalline phases, and the calculated weight fraction of each of the plurality of crystalline phases.

16. The quantitative phase analysis device according to claim 6,
wherein, when a substance parameter is obtained by dividing the chemical formula weight by the sum of the squares of the numbers of the electrons belonging to each of the atoms contained in the chemical formula unit, and when the sample contains one or more crystalline phases to be identified and a plurality of uncertain crystalline phases each having an uncertain chemical composition, and a chemical composition of the entire sample is determined, the calculating the weight ratio of the plurality of crystalline phases comprises calculating a weight fraction of each of the one or more crystalline phases to be identified and a weight fraction of the entire plurality of uncertain crystalline phases through use of a substance parameter of the entire plurality of uncertain crystalline phases, which has been calculated, and calculating the substance parameter of the entire plurality of uncertain crystalline phases through use of a substance parameter of the entire sample, a substance parameter of each of the one or more crystalline phases to be identified, the calculated weight fraction of each of the one or more crystalline phases to be identified, and the calculated weight fraction of the entire plurality of uncertain crystalline phases.

17. A quantitative phase analysis method for performing quantitative phase analysis of crystalline phases contained in a sample based on a powder x-ray diffraction pattern of the sample, the quantitative phase analysis method comprising:
    acquiring information on a plurality of crystalline phases contained in the sample;
    calculating a weight ratio of the plurality of crystalline phases based on a sum of diffracted intensities corrected with respect to a Lorentz-polarization factor, a chemical formula weight, and a sum of squares of numbers of electrons belonging to each of atoms contained in a chemical formula unit, in the plurality of crystalline phases acquired in the acquiring information on the plurality of crystalline phases; and
    output and display the weight ratio as an analysis result.

* * * * *